(12) United States Patent
Han

(10) Patent No.: US 9,860,715 B2
(45) Date of Patent: Jan. 2, 2018

(54) DATA TRANSMISSION METHOD, APPARATUS, AND SYSTEM

(71) Applicant: Huawei Technologies Co., Ltd., Shenzhen, Guangdong (CN)

(72) Inventor: Guanglin Han, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 14/870,559

(22) Filed: Sep. 30, 2015

(65) Prior Publication Data
US 2016/0021516 A1 Jan. 21, 2016

Related U.S. Application Data

(63) Continuation of application No. PCT/CN2013/073982, filed on Apr. 9, 2013.

(51) Int. Cl.
*H04W 4/06* (2009.01)
*H04W 68/00* (2009.01)
*H04W 76/00* (2009.01)

(52) U.S. Cl.
CPC .......... *H04W 4/06* (2013.01); *H04W 68/005* (2013.01); *H04W 76/002* (2013.01)

(58) Field of Classification Search
None
See application file for complete search history.

(56) References Cited

U.S. PATENT DOCUMENTS

| | | | |
|---|---|---|---|
| 2010/0080186 A1* | 4/2010 | Guo | H04W 28/08 370/329 |
| 2010/0267356 A1 | 10/2010 | Ohgushi et al. | |
| 2012/0202493 A1* | 8/2012 | Wang | H04W 60/00 455/435.1 |
| 2013/0155871 A1* | 6/2013 | Zhu | H04W 4/06 370/241.1 |

(Continued)

FOREIGN PATENT DOCUMENTS

| | | |
|---|---|---|
| CN | 1774124 A | 5/2006 |
| CN | 101547410 A | 9/2009 |

(Continued)

OTHER PUBLICATIONS

"MBMS Paging & RAB Assignment for Multicast UMTS (TR 23.846 new section 8.x)", Vodafone, 3GPP TSG SA WG2 Meeting, Jan. 18-22, 2002, 4 pages, Tdoc S2-020579.

*Primary Examiner* — Kodzovi Acolatse

(57) ABSTRACT

The present invention relates to a data transmission method, apparatus, and system, where the method includes: receiving, by a base station, a Multimedia Broadcast Multicast Service MBMS service transmission request and MBMS service data that are sent by a core network device; after receiving the MBMS service transmission request or the MBMS service data, sending, by the base station, an MBMS service paging message in a cell served by the base station; and sending, by the base station, the MBMS service data to user equipment UE according to the MBMS service transmission request. According to the present invention, a dynamic notification message initiated by a network can be received, and when the network needs to send MBMS service data, a UE can receive the MBMS service data in time.

13 Claims, 4 Drawing Sheets

(56) References Cited

U.S. PATENT DOCUMENTS

| | | | |
|---|---|---|---|
| 2013/0242738 A1* | 9/2013 | Chang | H04W 4/06 370/235 |
| 2013/0294320 A1* | 11/2013 | Jactat | H04L 12/189 370/312 |
| 2014/0010142 A1* | 1/2014 | Ranta-Aho | H04W 36/0061 370/312 |
| 2014/0153476 A1* | 6/2014 | Wang | H04L 65/4076 370/312 |
| 2014/0192701 A1* | 7/2014 | Drev | H04W 4/06 370/312 |

FOREIGN PATENT DOCUMENTS

| | | |
|---|---|---|
| CN | 101843122 A | 9/2010 |
| CN | 102256208 A | 11/2011 |
| EP | 1 435 751 A1 | 7/2004 |
| EP | 1 521 492 A2 | 4/2005 |

* cited by examiner

DATA TRANSMISSION METHOD, APPARATUS, AND SYSTEM

CROSS REFERENCE TO RELATED APPLICATIONS

This application is a continuation of International Application No. PCT/CN2013/073982, filed on Apr. 9, 2013, which is hereby incorporated by reference in its entity.

TECHNICAL FIELD

The present invention relates to the field of communications technologies, and in particular, to a data transmission method and apparatus.

BACKGROUND

In an existing mobile telecommunications system, data content requested by user equipment (User Equipment, UE) is transmitted in two manners: a unicast manner and a multicast manner. In the unicast transmission manner, a point-to-point unicast mechanism is used to send user data, that is, an independent transmission channel is established for each user. Even though different users need to receive same data content, the data content needs to be sent to each user once. In the multicast transmission manner, for a real-time service, different users may access a network at any time, and receive content from a same data channel. In this manner, a network side transmits only a same piece of data content that needs to be received by multiple users.

A Multimedia Broadcast Multicast Service (Multimedia Broadcast Multicast Service, MBMS) technology in an existing Long Term Evolution (Long Term Evolution, LTE) system supports broadcast and multicast of a video service. A mobile TV (Mobile TV) service is used as an example, when it is required to watch a Mobile TV, a UE receives corresponding video service data according to service resource allocation information indicated by a network, and the data is presented on the UE to a user.

However, in an existing MBMS service transmission manner, a user can start to receive video data only from a time point of access and watch video content, and a network cannot dynamically instruct the user to receive a temporarily initiated MBMS service, for example, a piece of big news that is added temporarily and pushed.

SUMMARY

An objective of the present invention is to provide a data transmission method and apparatus, applied to an MBMS service transmission process, so that a dynamic notification message initiated by a network can be received, and when the network needs to send MBMS service data, a UE can receive the MBMS service data in time.

To achieve the foregoing objective, a first aspect of the present invention provides a data transmission method, where the method includes:

receiving, by a base station, a Multimedia Broadcast Multicast Service MBMS service transmission request and MBMS service data that are sent by a core network device;

after receiving the MBMS service transmission request or the MBMS service data, sending, by the base station, an MBMS service paging message in a cell served by the base station, where the MBMS service paging message is used to instruct user equipment UE to receive the MBMS service; and sending, by the base station, the MBMS service data to the user equipment UE according to the MBMS service transmission request.

With reference to the first aspect, in a first possible implementation manner of the first aspect, the MBMS service paging message includes one type of or any combination of the following listed information:

a transceiving manner of an MBMS service, identifier information of an MBMS service, priority information of an MBMS service, and service provider information of an MBMS service.

With reference to the first aspect, in a second possible implementation manner of the first aspect, after the sending an MBMS service paging message, the method further includes: receiving, by the base station, a receiving acknowledgement message that is of an MBMS service and sent by the UE.

With reference to the second possible implementation manner of the first aspect, in a third possible implementation manner of the first aspect, the receiving acknowledgement message of an MBMS service includes information used to indicate an MBMS service that is supported by the UE.

With reference to the second possible implementation manner of the first aspect, in a fourth possible implementation manner of the first aspect, after the receiving, by the base station, a receiving acknowledgement message that is of an MBMS service and sent by the UE, the method further includes:

determining, by the base station according to the received receiving acknowledgement message of an MBMS service, a quantity of UEs corresponding to a same MBMS service in the cell served by the base station; and configuring, by the base station, a transmission manner of an MBMS service according to the quantity of UEs.

With reference to the fourth possible implementation manner of the first aspect, in a fifth possible implementation manner of the first aspect, the configuring a transmission manner of a service according to the quantity of UEs includes:

determining, by the base station, whether the quantity of UEs exceeds a preset threshold; and if the quantity of UEs exceeds the preset threshold, configuring and using a broadcast or multicast manner to transmit the MBMS service data to the UE; or if the quantity of UEs does not exceed the preset threshold, configuring and using a unicast manner to transmit the MBMS service data to the UE.

With reference to the first aspect, in a sixth possible implementation manner of the first aspect, the method further includes:

sending, by the base station, an MBMS service capability query request message to the UE; and receiving, by the base station, MBMS service capability information fed back by the UE.

With reference to the sixth possible implementation manner of the first aspect, in a seventh possible implementation manner of the first aspect, the MBMS service capability information includes a transmission capability of the UE, a transceiving manner that is of an MBMS service and supported by the UE, and/or identifier information that is of an MBMS service and that the UE allows to receive.

With reference to the sixth possible implementation manner of the first aspect, in an eighth possible implementation manner of the first aspect, after the receiving, by the base station, MBMS service capability information fed back by the UE, the method further includes:

sending, by the base station, the MBMS service capability information to the core network device, so that the core network device sends the MBMS service data according to the MBMS service capability information.

With reference to the first aspect, in a ninth possible implementation manner of the first aspect, before the receiving, by a base station, an MBMS service transmission request and MBMS service data that are sent by a core network device, the method further includes:

receiving, by the base station, MBMS support configuration information configured by an operating management system OAM; and performing, by the base station, configuration according to the MBMS support configuration information.

With reference to the ninth possible implementation manner of the first aspect, in a tenth possible implementation manner of the first aspect, the MBMS support configuration information includes one type of or any combination of the following listed information:

an identifier of an MBMS service area supported by the base station;

an identifier list of MBMS service areas supported by the base station;

an identifier of an MBMS service supported by the base station;

whether the base station supports MBMS MBMS on Demand service transmission that is initiated by a network and based on a user request;

whether the base station supports MBMS on Demand service transmission initiated by a UE;

an MBMS cell type supported by the base station; and a cell type corresponding to an identifier of an MBMS service supported by the base station.

According to a second aspect, the present invention further provides a data transmission method, where the method includes:

receiving, by a base station, an MBMS service transmission request and MBMS service data that are sent by a core network device;

after receiving the MBMS service transmission request or the MBMS service data, sending, by the base station, an MBMS service update message in a cell served by the base station, and making a ValTag that is used to indicate a system message change and is in a base station broadcast message unchanged, where the MBMS service update message is used to indicate that MBMS configuration information of a current cell changes; and sending, by the base station, the MBMS configuration information and the MBMS service data to the UE according to the MBMS service transmission request.

With reference to the second aspect, in a first possible implementation manner of the second aspect, the method further includes:

sending, by the base station, an MBMS service capability query request message to the UE; and receiving, by the base station, MBMS service capability information fed back by the UE.

With reference to the first possible implementation manner of the second aspect, in a second possible implementation manner of the second aspect, the MBMS service capability information includes a transmission capability of the UE, a transceiving manner that is of an MBMS service and supported by the UE, and/or identifier information that is of an MBMS service and that the UE allows to receive.

With reference to the first possible implementation manner of the second aspect, in a third possible implementation manner of the second aspect, after the receiving, by the base station, MBMS service capability information fed back by the UE, the method further includes:

sending, by the base station, the MBMS service capability information to the core network device.

According to a third aspect, the present invention further provides a data transmission method, where the method includes:

receiving, by a base station, an MBMS service transmission request and MBMS service data that are sent by a core network device;

when it is determined that a UE that needs to receive the MBMS service data is in an RRC connected state or is transmitting a unicast service, sending, by the base station, a connection release indication message to the UE, and instructing the UE to receive the MBMS service data, where the connection release indication message is used to instruct the UE to release a connection or terminate the unicast service; and configuring, by the base station, MBMS configuration information according to the MBMS service transmission request, and sending the MBMS configuration information and the MBMS service data to the UE.

With reference to the third aspect, in a first possible implementation manner of the third aspect, before the sending, by the base station, a connection release indication message to the UE, the method further includes:

determining, by the base station according to a receiving capability of the UE, whether the UE can receive a unicast service and an MBMS service at the same time; and if the UE can receive a unicast service and an MBMS service at the same time, skipping sending the connection release indication message; or if the UE cannot receive a unicast service and an MBMS service at the same time, sending the connection release indication message to the UE.

With reference to the third aspect, in a second possible implementation manner of the third aspect, the method further includes:

sending, by the base station, an MBMS service capability query request message to the UE; and receiving, by the base station, MBMS service capability information fed back by the UE.

With reference to the second possible implementation manner of the third aspect, in a third possible implementation manner of the third aspect, the MBMS service capability information includes a transmission capability of the UE, a transceiving manner that is of an MBMS service and supported by the UE, and/or identifier information that is of an MBMS service and that the UE allows to receive.

With reference to the second possible implementation manner of the third aspect, in a fourth possible implementation manner of the third aspect, after the receiving, by the base station, MBMS service capability information fed back by the UE, the method further includes:

sending, by the base station, the MBMS service capability information to the core network device.

According to a fourth aspect, the present invention further provides a data transmission method, where the method includes:

when user equipment UE receives an MBMS service paging message sent by a base station, if the MBMS service paging message includes an identifier related to the UE, responding, by the UE, to the MBMS service paging message; and receiving, by the UE, MBMS configuration information and MBMS service data that are sent by the base station.

With reference to the fourth aspect, in a first possible implementation manner of the fourth aspect, the identifier related to the UE includes one of or any combination of the following listed identifiers:

a UE identifier that matches an identifier of the UE;

a UE group identifier that matches an identifier of a group to which the UE belongs;

an MBMS service identifier that matches an MBMS service in which the UE is interested; and an MBMS session identifier that matches an identifier of an MBMS session in which the UE is interested.

With reference to the fourth aspect, in a second possible implementation manner of the fourth aspect, if the UE is in a radio resource control RRC idle state, the responding, by the UE, to the MBMS service paging message includes:

if the MBMS service paging message instructs the UE to use a broadcast or multicast manner to receive the MBMS service data, getting prepared, by the UE, to receive an MBMS service; or first establishing, by the UE, a connection with the base station, and getting prepared to receive the MBMS service data; or if the MBMS service paging message instructs the UE to use a unicast manner to receive the MBMS service data, first establishing, by the UE, a connection with the base station, and getting prepared to receive the MBMS service data.

With reference to the second possible implementation manner of the fourth aspect, in a third possible implementation manner of the fourth aspect, the establishing, by the UE, a connection with the base station includes:

sending, by the UE, a random access pilot signal to the base station, and accessing the base station;

and/or sending, by the UE, an RRC connection establishment request to the base station, and establishing an RRC connection with the base station.

With reference to the second possible implementation manner of the fourth aspect, in a fourth possible implementation manner of the fourth aspect, after the establishing a connection with the base station, the method further includes:

sending, by the UE, a receiving acknowledgement message of an MBMS service to the base station.

With reference to the fourth possible implementation manner of the fourth aspect, in a fifth possible implementation manner of the fourth aspect, the receiving acknowledgement message of an MBMS service includes information used to indicate an MBMS service that can be received by the UE.

With reference to the fourth aspect, in a sixth possible implementation manner of the fourth aspect, if the UE is in an RRC connected state, the responding, by the UE, to the MBMS service paging message includes:

determining, by the UE according to a receiving capability of the UE and/or a priority that is of an MBMS service and is in the MBMS service paging message, whether to receive the MBMS service data; and the receiving, by the UE, MBMS configuration information and MBMS service data that are sent by the base station includes: when the UE determines to receive the MBMS service data, receiving the MBMS configuration information and the MBMS service data that are sent by the base station.

With reference to the sixth possible implementation manner of the fourth aspect, in a seventh possible implementation manner of the fourth aspect, the determining, by the UE according to a receiving capability of the UE and/or a priority that is of an MBMS service and is in the MBMS service paging message, whether to receive the MBMS service data includes:

if the UE has a capability of receiving a unicast service and the MBMS service data at the same time, getting prepared, by the UE, to receive a unicast service and the MBMS service data at the same time; or if the UE does not have a capability of receiving a unicast service and the MBMS service data at the same time, determining whether a priority of a unicast service or an MBMS service being transmitted by the UE is higher than a priority of the MBMS service data; and if the priority of the unicast service or the MBMS service being transmitted is higher than the priority of the MBMS service data, continuing to receive the unicast service or the MBMS service being transmitted; or if the priority of the unicast service or the MBMS service being transmitted is not higher than the priority of the MBMS service data, receiving the MBMS service data.

With reference to the fourth aspect, in an eighth possible implementation manner of the fourth aspect, the receiving, by the UE, MBMS configuration information and MBMS service data that are sent by the base station includes:

receiving, by the UE, the MBMS configuration information sent by the base station, where the MBMS configuration information includes an MBMS control channel MCCH resource configuration message;

receiving, by the UE, corresponding MCCH information according to the MCCH resource configuration message; and receiving, by the UE, the MBMS service data from a resource location corresponding to the MCCH information.

With reference to the eighth possible implementation manner of the fourth aspect, in a ninth possible implementation manner of the fourth aspect, after the receiving, by the UE, the MBMS configuration information sent by the base station, the method further includes:

listening on whether the MBMS configuration information includes an MCCH change notification message; and when the UE receives the MCCH change notification message, stopping receiving the MCCH information corresponding to the MCCH resource configuration information; and receiving, in a next modification period of MCCH information, the MCCH information corresponding to the MCCH resource configuration information.

With reference to the ninth possible implementation manner of the fourth aspect, in a tenth possible implementation manner of the fourth aspect, after the UE receives the MCCH change notification message, the method further includes:

determining, by the UE, whether an MCCH identifier indicated by the MCCH change notification message matches an MCCH identifier corresponding to the MBMS service data of the UE; and if the MCCH identifier indicated by the MCCH change notification message matches the MCCH identifier corresponding to the MBMS service data of the UE, stopping receiving the MCCH information corresponding to the MCCH resource configuration information; or if the MCCH identifier indicated by the MCCH change notification message does not match the MCCH identifier corresponding to the MBMS service data of the UE, continuing to receive the MCCH information corresponding to the MCCH resource configuration information.

According to a fifth aspect, the present invention further provides a data transmission method, where the method includes:

when a UE receives an MBMS service update message sent by a base station, if the MBMS service update message includes an identifier related to the UE, receiving, by the UE, updated MBMS configuration information sent by the base station; and receiving, by the UE according to the updated MBMS configuration information, MBMS service data sent by the base station.

With reference to the fifth aspect, in a first possible implementation manner of the fifth aspect, the identifier related to the UE includes one of or any combination of the following listed identifiers:

a UE identifier that matches an identifier of the UE;

a UE group identifier that matches an identifier of a group to which the UE belongs;

an MBMS service identifier that matches an MBMS service in which the UE is interested; and an MBMS session identifier that matches an identifier of an MBMS session in which the UE is interested.

With reference to the fifth aspect, in a second possible implementation manner of the fifth aspect, the MBMS configuration information includes an MBMS control channel MCCH resource configuration message; and the receiving, by the UE according to the updated MBMS configuration information, MBMS service data sent by the base station includes:

receiving, by the UE, corresponding MCCH information according to the MCCH resource configuration message; and receiving, by the UE, the MBMS service data from a resource location corresponding to the MCCH information.

With reference to the second possible implementation manner of the fifth aspect, in a third possible implementation manner of the fifth aspect, after the receiving, by the UE, MBMS configuration information sent by the base station, the method further includes:

listening on whether the MBMS configuration information includes an MCCH change notification message; and when the UE receives the MCCH change notification message, stopping receiving the MCCH information corresponding to the MCCH resource configuration information; and receiving, in a next modification period of MCCH information, the MCCH information corresponding to the MCCH resource configuration information.

With reference to the third possible implementation manner of the fifth aspect, in a fourth possible implementation manner of the fifth aspect, after the UE receives the MCCH change notification message, the method further includes:

determining, by the UE, whether an MCCH identifier indicated by the MCCH change notification message matches an MCCH identifier corresponding to the MBMS service data of the UE; and if the MCCH identifier indicated by the MCCH change notification message matches the MCCH identifier corresponding to the MBMS service data of the UE, stopping receiving the MCCH information corresponding to the MCCH resource configuration information; or if the MCCH identifier indicated by the MCCH change notification message does not match the MCCH identifier corresponding to the MBMS service data of the UE, continuing to receive the MCCH information corresponding to the MCCH resource configuration information.

With reference to the fifth aspect, in a fifth possible implementation manner of the fifth aspect, if the UE is in an RRC connected state, before the receiving, by the UE, MBMS configuration information sent by the base station, the method further includes:

determining, by the UE according to a receiving capability of the UE and/or a priority that is of an MBMS service and is in the MBMS service paging message, whether to receive the MBMS service data; and if the UE determines to receive the MBMS service data, receiving the MBMS configuration information and the MBMS service data that are sent by the base station.

With reference to the fifth possible implementation manner of the fifth aspect, in a sixth possible implementation manner of the fifth aspect, the determining, by the UE according to a receiving capability of the UE and/or a priority that is of an MBMS service and is in the MBMS service paging message, whether to receive the MBMS service data includes:

if the UE has a capability of receiving a unicast service and the MBMS service data at the same time, getting prepared, by the UE, to receive a unicast service and the MBMS service data at the same time; or if the UE does not have a capability of receiving a unicast service and the MBMS service data at the same time, determining whether a priority of a unicast service or an MBMS service being transmitted by the UE is higher than a priority of the MBMS service data; and if the priority of the unicast service or the MBMS service being transmitted is higher than the priority of the MBMS service data, continuing to receive the unicast service or the MBMS service being transmitted; or if the priority of the unicast service or the MBMS service being transmitted is not higher than the priority of the MBMS service data, receiving the MBMS service data.

According to a sixth aspect, the present invention further provides a data transmission method, where the method includes:

when a UE is in an RRC connected state or is transmitting a unicast service, and when the UE receives a connection release indication message sent by a base station, releasing, by the UE, a current unicast connection or terminating the current unicast service, and receiving MBMS configuration information and MBMS service data that are sent by the base station.

With reference to the sixth aspect, in a first possible implementation manner of the sixth aspect, the connection release indication message includes one type of or any combination of the following listed information:

a UE identifier that matches an identifier of the UE;

a UE group identifier that matches an identifier of a group to which the UE belongs;

an MBMS service identifier that matches an MBMS service in which the UE is interested; and an MBMS session identifier that matches an identifier of an MBMS session in which the UE is interested.

With reference to the sixth aspect, in a second possible implementation manner of the sixth aspect, the receiving, by the UE, MBMS configuration information and MBMS service data that are sent by the base station includes:

receiving, by the UE, the MBMS configuration information sent by the base station, where the MBMS configuration information includes an MBMS control channel MCCH resource configuration message;

receiving, by the UE, corresponding MCCH information according to the MCCH resource configuration message; and receiving, by the UE, the MBMS service data from a resource location corresponding to the MCCH information.

With reference to the second possible implementation manner of the sixth aspect, in a third possible implementation manner of the sixth aspect, after the receiving, by the UE, the MBMS configuration information sent by the base station, the method further includes:

listening on whether the MBMS configuration information includes an MCCH change notification message; and when the UE receives the MCCH change notification message, stopping receiving the MCCH information corresponding to the MCCH resource configuration information; and receiving, in a next modification period of MCCH information, the MCCH information corresponding to the MCCH resource configuration information.

With reference to the third possible implementation manner of the sixth aspect, in a fourth possible implementation manner of the sixth aspect, after the UE receives the MCCH change notification message, the method further includes:

determining, by the UE, whether an MCCH identifier indicated by the MCCH change notification message matches an MCCH identifier corresponding to the MBMS service data of the UE; and if the MCCH identifier indicated by the MCCH change notification message matches the MCCH identifier corresponding to the MBMS service data of the UE, stopping receiving the MCCH information corresponding to the MCCH resource configuration information; or if the MCCH identifier indicated by the MCCH change notification message does not match the MCCH identifier corresponding to the MBMS service data of the UE, continuing to receive the MCCH information corresponding to the MCCH resource configuration information.

With reference to the sixth aspect, in a fifth possible implementation manner of the sixth aspect, before the receiving, by the UE, MBMS configuration information and MBMS service data that are sent by the base station, the method further includes:

determining, by the UE according to a receiving capability of the UE and/or a priority that is of an MBMS service and is in the MBMS service paging message, whether to receive the MBMS service data; and if the UE determines to receive the MBMS service data, receiving the MBMS configuration information and the MBMS service data that are sent by the base station.

With reference to the fifth possible implementation manner of the sixth aspect, in a sixth possible implementation manner of the sixth aspect, the determining, by the UE according to a receiving capability of the UE and/or a priority that is of an MBMS service and is in the MBMS service paging message, whether to receive the MBMS service data includes:

if the UE has a capability of receiving a unicast service and the MBMS service data at the same time, getting prepared, by the UE, to receive a unicast service and the MBMS service data at the same time; or if the UE does not have a capability of receiving a unicast service and the MBMS service data at the same time, determining whether a priority of a unicast service or an MBMS service being transmitted by the UE is higher than a priority of the MBMS service data; and if the priority of the unicast service or the MBMS service being transmitted is higher than the priority of the MBMS service data, continuing to receive the unicast service or the MBMS service being transmitted; or if the priority of the unicast service or the MBMS service being transmitted is not higher than the priority of the MBMS service data, receiving the MBMS service data.

According to a seventh aspect, the present invention further provides a base station, including: a receiving unit, a processing unit, and a sending unit, where the receiving unit is configured to receive a Multimedia Broadcast Multicast Service MBMS service transmission request and MBMS service data that are sent by a core network device;

the processing unit is configured to: when the receiving unit receives the MBMS service transmission request or the MBMS service data, instruct the sending unit to send an MBMS service paging message in a cell served by the base station; where the MBMS service paging message is used to instruct user equipment UE to receive the MBMS service data; and the sending unit is configured to receive an instruction of the processing unit, and send the MBMS service paging message in the cell served by the base station; where the processing unit is further configured to configure MBMS configuration information according to the MBMS service transmission request received by the receiving unit; and the sending unit is further configured to send, to the user equipment UE, the MBMS configuration information obtained by the processing unit and the MBMS service data received by the receiving unit.

According to an eighth aspect, the present invention further provides a base station, including: a receiving unit, a processing unit, and a sending unit, where the receiving unit is configured to receive an MBMS service transmission request and MBMS service data that are sent by a core network device;

the processing unit is configured to: when the receiving unit receives the MBMS service transmission request or the MBMS service data, instruct the sending unit to send an MBMS service update message in a cell served by the base station, and make a ValTag that indicates a system message change and is in a base station broadcast message unchanged, where the MBMS service update message is used to indicate that MBMS configuration information of a current cell changes; and the sending unit is configured to receive an instruction of the processing unit, and send the MBMS service update message in the cell served by the base station; where the sending unit is further configured to send, to user equipment UE according to the MBMS service transmission request, the MBMS service data received by the receiving unit.

According to a ninth aspect, the present invention further provides a base station, including: a receiving unit, a processing unit, and a sending unit, where the receiving unit is configured to receive an MBMS service transmission request and MBMS service data that are sent by a core network device;

the processing unit is configured to: determine whether a UE that needs to receive the MBMS service data is in an RRC connected state or is transmitting a unicast service, and when it is determined that the UE that needs to receive the MBMS service data is in an RRC connected state or is transmitting a unicast service, instruct the sending unit to send a connection release indication message to the UE; and the sending unit is configured to receive an instruction of the processing unit, and send a connection release indication message to the UE; where the processing unit is further configured to configure MBMS configuration information according to the MBMS service transmission request received by the receiving unit; and the sending unit is further configured to send, to the user equipment UE, the MBMS configuration information obtained by the processing unit and the MBMS service data received by the receiving unit.

According to a tenth aspect, the present invention further provides user equipment, including: a receiving unit and a processing unit, where the receiving unit is configured to receive an MBMS service paging message sent by a base station; and the processing unit is configured to: if the MBMS service paging message received by the receiving unit includes an identifier related to the UE, respond to the MBMS service paging message, where the receiving unit is further configured to: when the processing unit responds to the MBMS service paging message, receive MBMS configuration information and MBMS service data that are sent by the base station.

According to an eleventh aspect, the present invention further provides user equipment, including: a receiving unit and a processing unit, where the receiving unit is configured to receive an MBMS service update message sent by a base station; and the processing unit is configured to: if the MBMS service update message received by the receiving unit includes an identifier related to the UE, respond to the MBMS service update message, where the receiving unit is further configured to: when the processing unit responds to the MBMS service update message, receive updated MBMS configuration information sent by the base station, and receive, according to the updated MBMS configuration information, MBMS service data sent by the base station.

According to a twelfth aspect, the present invention further provides user equipment, including: a receiving unit and a processing unit, where the receiving unit is configured to receive a connection release indication message sent by a base station;

the processing unit is configured to: when the receiving unit receives the connection release indication message, release a current unicast connection or terminate a current unicast service; where the receiving unit is further configured to: after the processing unit releases the current unicast connection or terminate the current unicast service, receive MBMS configuration information and MBMS service data that are sent by the base station.

According to a thirteenth aspect, the present invention further provides a base station, including: a processor, a first interface, and a second interface; where the first interface is configured to interact with a core network device;

the second interface is configured to interact with user equipment UE; and the processor is configured to:

receive, through the first interface, an MBMS service transmission request and MBMS service data that are sent by the core network device;

after receiving the MBMS service transmission request or the MBMS service data, send, through the second interface, an MBMS service paging message in a cell served by the base station, where the MBMS service paging message is used to instruct the user equipment UE to receive the MBMS service data; and send the MBMS service data to the UE through the second interface according to the MBMS service transmission request.

With reference to the thirteenth aspect, in a first possible implementation manner of the thirteenth aspect, the MBMS service paging message sent by the processor through the second interface includes one type of or any combination of the following listed information:

a transceiving manner of an MBMS service, identifier information of an MBMS service, priority information of an MBMS service, and service provider information of an MBMS service.

With reference to the thirteenth aspect, in a second possible implementation manner of the thirteenth aspect, after sending the MBMS service paging message through the second interface, the processor is further configured to:

receive, through the second interface, a receiving acknowledgement message that is of an MBMS service and sent by the UE.

With reference to the second possible implementation manner of the thirteenth aspect, in a third possible implementation manner of the thirteenth aspect, the receiving acknowledgement message that is of an MBMS service and received by the processor through the second interface includes information used to indicate an MBMS service that can be received by the UE.

With reference to the second possible implementation manner of the thirteenth aspect, in a fourth possible implementation manner of the thirteenth aspect, after receiving, through the second interface, the receiving acknowledgement message that is of an MBMS service and sent by the UE, the processor is further configured to:

determine, according to the received receiving acknowledgement message of an MBMS service, a quantity of UEs corresponding to a same MBMS service in the cell served by the base station; and configure a transmission manner of an MBMS service according to the quantity of UEs.

With reference to the fourth possible implementation manner of the thirteenth aspect, in a fifth possible implementation manner of the thirteenth aspect, that the processor is configured to configure a transmission manner of an MBMS service according to the quantity of UEs specifically includes that:

the processor is configured to:

determine whether the quantity of UEs exceeds a preset threshold; and if the quantity of UEs exceeds the preset threshold, configure and use a broadcast or multicast manner to transmit the MBMS service data to the UE through the second interface; or if the quantity of UEs does not exceed the preset threshold, configure and use a unicast manner to transmit the MBMS service data to the UE through the second interface.

With reference to the thirteenth aspect, in a sixth possible implementation manner of the thirteenth aspect, the processor is further configured to:

send an MBMS service capability query request message to the UE through the second interface; and receive, through the second interface, MBMS service capability information fed back by the UE.

With reference to the sixth possible implementation manner of the thirteenth aspect, in a seventh possible implementation manner of the thirteenth aspect, the MBMS service capability information received by the processor through the second interface includes a transmission capability of the UE, a transceiving manner that is of an MBMS service and supported by the UE, and/or identifier information that is of an MBMS service and that the UE allows to receive.

With reference to the sixth possible implementation manner of the thirteenth aspect, in an eighth possible implementation manner of the thirteenth aspect, the processor is further configured to:

after receiving, through the second interface, the MBMS service capability information fed back by the UE, send the MBMS service capability information to the core network device through the first interface, so that the core network device sends the MBMS service data according to the MBMS service capability information.

With reference to the thirteenth aspect, in a ninth possible implementation manner of the thirteenth aspect, the base station further includes a third interface, configured to interact with an operating management system OAM; and the processor is further configured to:

receive, through the third interface, MBMS support configuration information configured by the OAM, where the MBMS support configuration information is used to indicate a configuration required to transmit the MBMS service data; and perform configuration according to the MBMS support configuration information.

With reference to the ninth possible implementation manner of the thirteenth aspect, in a tenth possible implementation manner of the thirteenth aspect, the MBMS support configuration information includes one type of or any combination of the following listed information:

an identifier of an MBMS service area supported by the base station;

an identifier list of MBMS service areas supported by the base station;

an identifier of an MBMS service supported by the base station;

whether the base station supports MBMS on Demand service transmission initiated by a network;

whether the base station supports MBMS on Demand service transmission initiated by a UE;

an MBMS cell type supported by the base station; and a cell type corresponding to an identifier of an MBMS service supported by the base station.

With reference to the thirteenth aspect, in an eleventh possible implementation manner of the thirteenth aspect, the base station is an evolved NodeB eNodeB.

According to a fourteenth aspect, the present invention further provides a base station, including: a processor, a first interface, and a second interface; where the first interface is configured to interact with a core network device;

the second interface is configured to interact with a UE; and the processor is configured to:

receive, through the first interface, an MBMS service transmission request and MBMS service data that are sent by the core network device;

after receiving the MBMS service transmission request or the MBMS service data, send, through the second interface, an MBMS service update message in a cell served by the base station, and making a ValTag that is used to indicate a system message change and is in a base station broadcast message unchanged, where the MBMS service update message is used to indicate that MBMS configuration information of a current cell changes; and configure the MBMS configuration information according to the MBMS service transmission request, and send the MBMS configuration information and the MBMS service data to the UE through the second interface.

With reference to the fourteenth aspect, in a first possible implementation manner of the fourteenth aspect, the processor is further configured to:

send an MBMS service capability query request message to the UE through the second interface; and receive, through the second interface, MBMS service capability information fed back by the UE.

With reference to the first possible implementation manner of the fourteenth aspect, in a second possible implementation manner of the fourteenth aspect, the MBMS service capability information received by the processor through the second interface includes a transmission capability of the UE, a transceiving manner that is of an MBMS service and supported by the UE, and/or identifier information that is of an MBMS service and that the UE allows to receive.

With reference to the first possible implementation manner of the fourteenth aspect, in a third possible implementation manner of the fourteenth aspect, the processor is further configured to:

after receiving, through the second interface, the MBMS service capability information fed back by the UE, send the MBMS service capability information to the core network device through the first interface.

With reference to the fourteenth aspect, in a fourth possible implementation manner of the fourteenth aspect, the base station is an evolved NodeB eNodeB.

According to a fifteenth aspect, the present invention further provides a base station, including: a processor, a first interface, and a second interface; where the first interface is configured to interact with a core network device;

the second interface is configured to interact with a UE; and the processor is configured to:

receive, through the first interface, an MBMS service transmission request and MBMS service data that are sent by the core network device;

when it is determined that a UE that needs to receive the MBMS service data is in an RRC connected state or is transmitting a unicast service, send a connection release indication message to the UE through the second interface, and instruct the UE to receive the MBMS service data, where the connection release indication message is used to instruct the UE to release a connection or terminate the unicast service; and configure MBMS configuration information according to the MBMS service transmission request, and send the MBMS configuration information and the MBMS service data to the UE through the second interface.

With reference to the fifteenth aspect, in a first possible implementation manner of the fifteenth aspect, before sending the connection release indication message to the UE through the second interface, the processor is further configured to:

determine, according to a receiving capability of the UE, whether the UE can receive a unicast service and an MBMS service at the same time; and if the UE can receive a unicast service and an MBMS service at the same time, skip sending the connection release indication message; or if the UE cannot receive a unicast service and an MBMS service at the same time, send the connection release indication message to the UE through the second interface.

With reference to the fifteenth aspect, in a second possible implementation manner of the fifteenth aspect, the processor is further configured to:

send an MBMS service capability query request message to the UE through the second interface; and receive, through the second interface, MBMS service capability information fed back by the UE.

With reference to the second possible implementation manner of the fifteenth aspect, in a third possible implementation manner of the fifteenth aspect, the MBMS service capability information received by the processor through the second interface includes a transmission capability of the UE, a transceiving manner that is of an MBMS service and supported by the UE, and/or identifier information that is of an MBMS service and that the UE allows to receive.

With reference to the second possible implementation manner of the fifteenth aspect, in a fourth possible implementation manner of the fifteenth aspect, the processor is further configured to:

after receiving, through the second interface, the MBMS service capability information fed back by the UE, send the MBMS service capability information to the core network device through the first interface.

With reference to the fifteenth aspect, in a fifth possible implementation manner of the fifteenth aspect, the base station is an evolved NodeB eNodeB.

According to a sixteenth aspect, the present invention further provides user equipment, including: a processor and a communications interface, where the communications interface is configured to interact with a base station; and the processor is configured to:

receive, through the communications interface, an MBMS service paging message sent by the base station;

if the MBMS service paging message includes an identifier related to the user equipment UE, respond to the MBMS service paging message; and receive, through the communications interface, MBMS configuration information and MBMS service data that are sent by the base station.

With reference to the sixteenth aspect, in a first possible implementation manner of the sixteenth aspect, the identifier related to the UE includes one of or any combination of the following listed identifiers:

a UE identifier that matches an identifier of the UE;

a UE group identifier that matches an identifier of a group to which the UE belongs;

an MBMS service identifier that matches an MBMS service in which the UE is interested; and an MBMS session identifier that matches an identifier of an MBMS session in which the UE is interested.

With reference to the sixteenth aspect, in a second possible implementation manner of the sixteenth aspect, if the UE is in a radio resource control RRC idle state, that the processor is configured to respond to the MBMS service paging message includes that:

the processor is configured to:

if the MBMS service paging message instructs the UE to use a broadcast or multicast manner to receive the MBMS service data, get prepared to receive an MBMS service through the communications interface; or first establish a connection with the base station through the communications interface, and get prepared to receive an MBMS service; or if the MBMS service paging message instructs the UE to use a unicast manner to receive the MBMS service data, first establish a connection with the base station through the communications interface, and get prepared to receive an MBMS service.

With reference to the second possible implementation manner of the sixteenth aspect, in a third possible implementation manner of the sixteenth aspect, that the processor is configured to establish a connection with the base station through the communications interface includes that:

the processor is configured to:

send a random access pilot signal to the base station through the communications interface, and access the base station; and/or send an RRC connection establishment request to the base station through the communications interface, and establish an RRC connection with the base station.

With reference to the second possible implementation manner of the sixteenth aspect, in a fourth possible implementation manner of the sixteenth aspect, the processor is further configured to:

after establishing the connection with the base station, send a receiving acknowledgement message of an MBMS service to the base station through the communications interface.

With reference to the fourth possible implementation manner of the sixteenth aspect, in a fifth possible implementation manner of the sixteenth aspect, the receiving acknowledgement message of an MBMS service includes information used to indicate an MBMS service that can be received by the UE.

With reference to the sixteenth aspect, in a fifth possible implementation manner of the sixteenth aspect, if the UE is in an RRC connected state, that the processor is configured to respond to the MBMS service paging message includes that:

the processor is configured to:

deter mine, according to a receiving capability of the UE and/or a priority that is of an MBMS service and is in the MBMS service paging message, whether to receive the MBMS service data; and that the processor is configured to indicate information about an MBMS service that can be received by the UE includes: when it is determined to receive the MBMS service data, receiving, through the communications interface, the MBMS configuration information and the MBMS service data that are sent by the base station.

With reference to the fifth possible implementation manner of the sixteenth aspect, in a sixth possible implementation manner of the sixteenth aspect, that the processor is configured to determine, according to a receiving capability of the UE and/or a priority that is of an MBMS service and is in the MBMS service paging message, whether to receive the MBMS service data specifically includes that:

the processor is configured to:

if the UE has a capability of receiving a unicast service and the MBMS service data at the same time, get prepared to receive a unicast service and the MBMS service data through the communications interface at the same time; or if the UE does not have a capability of receiving a unicast service and the MBMS service data at the same time, determine whether a priority of a unicast service or an MBMS service being transmitted by the UE is higher than a priority of the MBMS service data; and if the priority of the unicast service or the MBMS service being transmitted is higher than the priority of the MBMS service data, continue to receive, through the communications interface, the unicast service or the MBMS service being transmitted; or if the priority of the unicast service or the MBMS service being transmitted is not higher than the priority of the MBMS service data, receive the MBMS service data through the communications interface.

With reference to the sixteenth aspect, in a seventh possible implementation manner of the sixteenth aspect, that the processor is configured to receive, through the communications interface, MBMS configuration information and MBMS service data that are sent by the base station specifically includes that:

the processor is configured to:

receive, through the communications interface, the MBMS configuration information sent by the base station, where the MBMS configuration information includes an MBMS control channel MCCH resource configuration message;

receive corresponding MCCH information according to the MCCH resource configuration message; and receive, through the communications interface, the MBMS service data from a resource location corresponding to the MCCH information.

With reference to the seventh possible implementation manner of the sixteenth aspect, in an eighth possible implementation manner of the sixteenth aspect, the processor is further configured to:

after receiving, through the communications interface, the MBMS configuration information sent by the base station, listen on whether the MBMS configuration information includes an MCCH change notification message; and when the UE receives the MCCH change notification message, stop receiving the MCCH information corresponding to the MCCH resource configuration information; and receive, through the communications interface in a next modification period of MCCH information, the MCCH information corresponding to the MCCH resource configuration information.

With reference to the eighth possible implementation manner of the sixteenth aspect, in a ninth possible implementation manner of the sixteenth aspect, after receiving the MCCH change notification message through the communications interface, the processor is further configured to:

determine whether an MCCH identifier indicated by the MCCH change notification message matches an MCCH identifier corresponding to the MBMS service data; and if the MCCH identifier indicated by the MCCH change notification message matches the MCCH identifier corresponding to the MBMS service data, stop receiving the MCCH information corresponding to the MCCH resource configuration information; or if the MCCH identifier indicated by the MCCH change notification message does not match the MCCH identifier corresponding to the MBMS service data, continue to receive, through the communications interface, the MCCH information corresponding to the MCCH resource configuration information.

According to a seventeenth aspect, the present invention further provides user equipment, including: a processor and a communications interface, where the communications interface is configured to interact with a base station; and the processor is configured to:

receive, through the communications interface, an MBMS service update message sent by the base station;

if the MBMS service update message includes an identifier related to the UE, respond to the MBMS service update message;

receive, through the communications interface, MBMS configuration information sent by the base station, so as to acquire the updated MBMS configuration information; and receive, through the communications interface according to the updated MBMS configuration information, MBMS service data sent by the base station.

With reference to the seventeenth aspect, in a first possible implementation manner of the seventeenth aspect, the identifier related to the UE includes one of or any combination of the following listed identifiers:

a UE identifier that matches an identifier of the UE;

a UE group identifier that matches an identifier of a group to which the UE belongs;

an MBMS service identifier that matches an MBMS service in which the UE is interested; and an MBMS session identifier that matches an identifier of an MBMS session in which the UE is interested.

With reference to the seventeenth aspect, in a second possible implementation manner of the seventeenth aspect, the MBMS configuration information includes an MBMS control channel MCCH resource configuration message; and that the processor is configured to receive, according to the updated MBMS configuration information, MBMS service data sent by the base station includes that:

the processor is configured to:

receive corresponding MCCH information according to the MCCH resource configuration message; and receive, through the communications interface, the MBMS service data from a resource location corresponding to the MCCH information.

With reference to the second possible implementation manner of the seventeenth aspect, in a third possible implementation manner of the seventeenth aspect, the processor is further configured to:

after receiving, through the communications interface, the MBMS configuration information sent by the base station, listen on whether the MBMS configuration information includes an MCCH change notification message; and when the UE receives the MCCH change notification message, stop receiving the MCCH information corresponding to the MCCH resource configuration information; and receive, through the communications interface in a next modification period of MCCH information, the MCCH information corresponding to the MCCH resource configuration information.

With reference to the third possible implementation manner of the seventeenth aspect, in a fourth possible implementation manner of the seventeenth aspect, after receiving the MCCH change notification message through the communications interface, the processor is further configured to:

determine whether an MCCH identifier indicated by the MCCH change notification message matches an MCCH identifier corresponding to the MBMS service data of the UE; and if the MCCH identifier indicated by the MCCH change notification message matches the MCCH identifier corresponding to the MBMS service data of the UE, stop receiving the MCCH information corresponding to the MCCH resource configuration information; or if the MCCH identifier indicated by the MCCH change notification message does not match the MCCH identifier corresponding to the MBMS service data of the UE, continue to receive, through the communications interface, the MCCH information corresponding to the MCCH resource configuration information.

With reference to the third possible implementation manner of the seventeenth aspect, in a fifth possible implementation manner of the seventeenth aspect, if the UE is in an RRC connected state, the processor is further configured to:

before the UE receives the MBMS configuration information sent by the base station, determine, according to a receiving capability of the UE and/or a priority that is of an MBMS service and is in the MBMS service paging message, whether to receive the MBMS service data; and if it is determined to receive the MBMS service data, receive, through the communications interface, the MBMS configuration information and the MBMS service data that are sent by the base station.

With reference to the fifth possible implementation manner of the seventeenth aspect, in a sixth possible implementation manner of the seventeenth aspect, that the processor is configured to determine, according to a receiving capability of the UE and/or a priority that is of an MBMS service and is in the MBMS service paging message, whether to receive the MBMS service data specifically includes that:

the processor is configured to:

if the UE has a capability of receiving a unicast service and the MBMS service data at the same time, get prepared to receive a unicast service and the MBMS service data through the communications interface at the same time; or if the UE does not have a capability of receiving a unicast service and the MBMS service data at the same time, determine whether a priority of a unicast service or an MBMS service being transmitted by the UE is higher than a priority of the MBMS service data; and if the priority of the unicast service or the MBMS service being transmitted is higher than the priority of the MBMS service data, continue to receive, through the communications interface, the unicast service or the MBMS service being transmitted; or if the priority of the unicast service or the MBMS service being transmitted is not higher than the priority of the MBMS service data, receive the MBMS service data through the communications interface.

According to an eighteenth aspect, the present invention further provides user equipment, including: a processor and a communications interface, where the communications interface is configured to interact with a base station; and the processor is configured to:

when the UE is in an RRC connected state or is transmitting a unicast service, receive, through the communications interface, a connection release indication message sent by the base station; and release a current unicast connection or terminate the current unicast service, and receive, through the communications interface, MBMS configuration information and MBMS service data that are sent by the base station.

With reference to the eighteenth aspect, in a first possible implementation manner of the eighteenth aspect, the connection release indication message includes one type of or any combination of the following listed information:

a UE group identifier that matches an identifier of a group to which the UE belongs;

an MBMS service identifier that matches an MBMS service in which the UE is interested; and an MBMS session identifier that matches an identifier of an MBMS session in which the UE is interested.

With reference to the eighteenth aspect, in a second possible implementation manner of the eighteenth aspect, that the processor is configured to receive, through the communications interface, MBMS configuration information and MBMS service data that are sent by the base station specifically includes that:

the processor is configured to:

receive, through the communications interface, the MBMS configuration information sent by the base station, where the MBMS configuration information includes an MBMS control channel MCCH resource configuration message;

receive corresponding MCCH information according to the MCCH resource configuration message; and receive, through the communications interface, the MBMS service data from a resource location corresponding to the MCCH information.

With reference to the second possible implementation manner of the eighteenth aspect, in a third possible implementation manner of the eighteenth aspect, the processor is further configured to:

after receiving, through the communications interface, the MBMS configuration information sent by the base station, listen on whether the MBMS configuration information includes an MCCH change notification message; and when the UE receives the MCCH change notification message, stop receiving the MCCH information corresponding to the MCCH resource configuration information; and receive, through the communications interface in a next modification period of MCCH information, the MCCH information corresponding to the MCCH resource configuration information.

With reference to the third possible implementation manner of the eighteenth aspect, in a fourth possible implementation manner of the eighteenth aspect, after receiving the MCCH change notification message through the communications interface, the processor is further configured to:

determine whether an MCCH identifier indicated by the MCCH change notification message matches an MCCH identifier corresponding to the MBMS service data of the UE; and if the MCCH identifier indicated by the MCCH change notification message matches the MCCH identifier corresponding to the MBMS service data of the UE, stop receiving the MCCH information corresponding to the MCCH resource configuration information; or if the MCCH identifier indicated by the MCCH change notification message does not match the MCCH identifier corresponding to the MBMS service data of the UE, continue to receive, through the communications interface, the MCCH information corresponding to the MCCH resource configuration information.

With reference to the eighteenth aspect, in a fifth possible implementation manner of the eighteenth aspect, before the processor is configured to receive, through the communications interface, MBMS configuration information and MBMS service data that are sent by the base station, the processor is further configured to:

determine, according to a receiving capability of the UE and/or a priority that is of an MBMS service and is in the MBMS service paging message, whether to receive the MBMS service data; and if it is determined to receive the MBMS service data, receive, through the communications interface, the MBMS configuration information and the MBMS service data that are sent by the base station.

With reference to the fifth possible implementation manner of the eighteenth aspect, in a sixth possible implementation manner of the eighteenth aspect, that the processor is configured to determine, according to a receiving capability of the UE and/or a priority that is of an MBMS service and is in the MBMS service paging message, whether to receive the MBMS service data specifically includes that:

the processor is configured to:

if the UE has a capability of receiving a unicast service and the MBMS service data at the same time, get prepared to receive a unicast service and the MBMS service data through the communications interface at the same time; or if the UE does not have a capability of receiving a unicast service and the MBMS service data at the same time, determine whether a priority of a unicast service or an MBMS service being transmitted by the UE is higher than a priority of the MBMS service data; and if the priority of the unicast service or the MBMS service being transmitted is higher than the priority of the MBMS service data, continue to receive, through the communications interface, the unicast service or the MBMS service being transmitted; or if the priority of the unicast service or the MBMS service being transmitted is not higher than the priority of the MBMS service data, receive the MBMS service data through the communications interface.

According to a nineteenth aspect, the present invention further provides a data transmission system, including:

the base station in the embodiments of the present invention and the user equipment in the embodiments of the present invention.

According to the data transmission method, apparatus, and system provided in the present invention, after receiving an MBMS service transmission request sent by a network, a base station transmits MBMS service data to user equipment by initiating paging or sending an update message, so that a terminal can receive a dynamic notification message in time.

DETAILED DESCRIPTION

The following further describes the technical solutions of the present invention in detail with reference to the accompanying drawings and embodiments.

A data transmission method, apparatus, and system provided in embodiments of the present invention is applied to MBMS service data transmission in an LTE system, which mainly includes a transmission process between an access network device, user equipment, and a core network device. The access network device is generally an evolved NodeB eNodeB (base station for short), the user equipment UE is generally a mobile terminal such as a mobile phone, and the core network device is generally a mobility management entity (Mobility Management Entity, MME), an MBMS gateway (MBMS gateway, MBMS GW), or the like.

Figure 1:
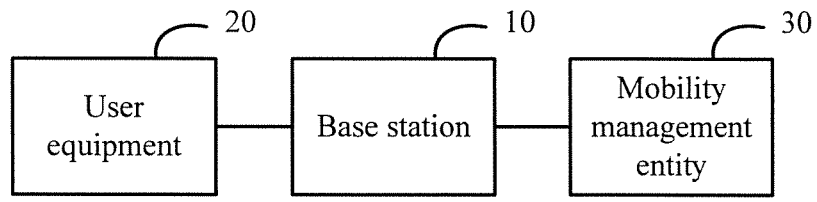
FIG. 1 is a schematic structural diagram of a data transmission system according to an embodiment of the present invention.

FIG. 1 is a schematic structural diagram of a data transmission system according to an embodiment of the present invention. As shown in FIG. 1, the data transmission system in the present invention includes: a base station 10, user equipment 20, and a mobility management entity 30.

When MBMS service data needs to be sent in a network, an MBMS service transmission request may be initiated by the mobility management entity 30 to the base station 10; the base station 10 sends a paging message or an update message to the user equipment 20, and the user equipment receives the MBMS service data after responding to the corresponding paging message or update message.

Embodiment 1

Figure 2:
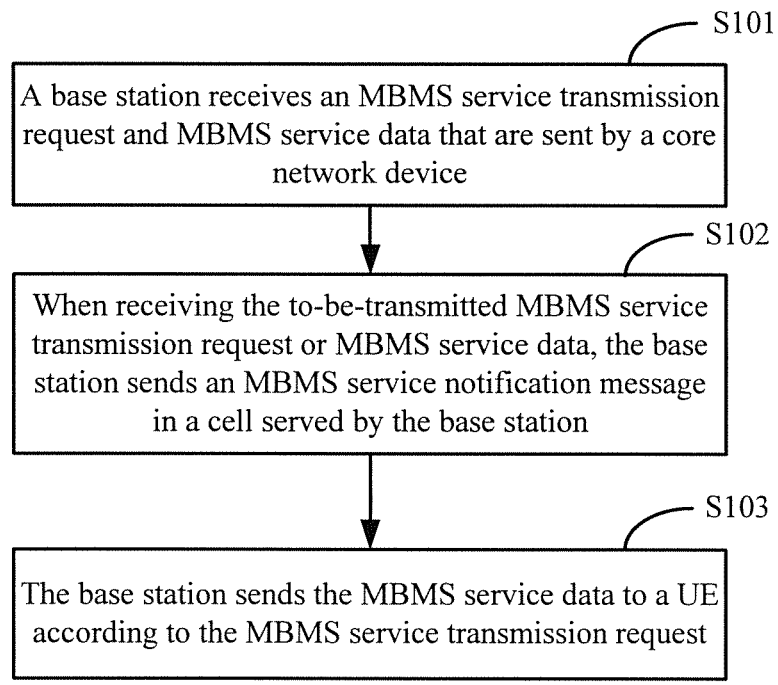
FIG. 2 is a flowchart of a data transmission method according to Embodiment 1 of the present invention.

FIG. 2 is a flowchart of a data transmission method according to this embodiment. As shown in FIG. 2, the data transmission method in the present invention includes:

S101. A base station receives an MBMS service transmission request and MBMS service data that are sent by a core network device.

When the core network device, such as an MME, needs to transmit the MBMS service data, generally, the core network device first sends an MBMS service transmission request to the base station, and then sends the MBMS service data. The base station receives the corresponding MBMS service transmission request and MBMS service data.

S102. After receiving the to-be-transmitted MBMS service transmission request or MBMS service data, the base station sends an MBMS service notification message in a cell served by the base station, where the MBMS service notification message is used to instruct user equipment to receive the MBMS service data.

Optionally, the base station may send, after receiving the MBMS service transmission request, the MBMS service notification message in the cell served by the base station; or the base station may send, after receiving the MBMS service data, the MBMS service notification message in the cell served by the base station.

The MBMS service receiving notification message includes an MBMS service paging message, an MBMS service update message, a base station broadcast message, a connection release indication message, or the like.

Optionally, the base station may send an MBMS service paging message in the cell served by the base station to initiate a paging procedure, or the base station may send an MBMS service update message in the cell served by the base station, or when the base station determines that a UE that needs to receive the MBMS service data is in an RRC connected state or is transmitting a unicast service, the base station may send a connection release indication message. Configuration on which MBMS service receiving notification message is specifically sent may be performed according to an actual application requirement.

Content of the MBMS service paging message may be set according to a requirement in an actual application scenario, and is generally set according to the received MBMS service transmission request or MBMS service data. Specifically, the MBMS service paging message may include but is not limited to: a transceiving manner of an MBMS service, identifier information of an MBMS service, priority information of an MBMS service, and service provider information of an MBMS service, and the like.

The identifier information of an MBMS service includes: identifier information of a UE that receives an MBMS service, a group identifier information of a UE that receives an MBMS service, an MBMS service type, an MBMS service identifier, an MBMS service group identifier, an MBMS service session identifier, a single frequency network area identifier of an MBMS service, a service area identifier of an MBMS service, and the like. Specifically, the identifier information of a UE that receives an MBMS service may include an identifier of a UE that currently needs to receive an MBMS service, or an identifier list of UEs that currently need to receive an MBMS service. The group identifier information of a UE that receives an MBMS service may include a group identifier of a UE that currently needs to receive an MBMS service, or a group identifier list of UEs that currently need to receive an MBMS service. The MBMS service data type may include: a video, audio, a data file, a software update, and the like. The service provider information of an MBMS service may include: a service provider identifier, a content provider identifier, and the like.

The transceiving manner of an MBMS service may include: a sending manner of an MBMS service to be received by the UE, such as an MBMS service (MBMS on Demand) based on a user request, and an MT MBMS service; and a receiving manner of the MBMS service data of the UE, such as an MBMS receiving manner, a unicast Unicast receiving manner, and a combination of Unicast and MBMS.

The priority information of the MBMS service data of the UE may include: a priority identifier of a unicast service and/or a priority identifier of another multicast service.

The MBMS service update message may be used to indicate that MBMS configuration information of a current cell changes, so that the UE that needs to receive the MBMS service updates the MBMS configuration information, where the MBMS configuration information may include MBMS service content and/or an MBMS service resource.

It should be noted that, when the base station sends the MBMS service update message in the cell served by the base station, an indication tag ValTag that is used to indicate a system message change and is in a base station broadcast message may be made unchanged, to prevent another UE from updating a system broadcast, which avoids an unnecessary update operation performed on the system broadcast by a terminal. That is, when the ValTag remains unchanged, if the UE does not perform corresponding MBMS service data transmission, no update operation is performed on the system broadcast.

If the base station determines that the UE that needs to receive the corresponding MBMS service data is in an RRC connected state, or is transmitting a unicast service or an MBMS service, the base station determines, according to a receiving capability of the UE, whether the UE can receive a unicast service and an MBMS service at the same time; and if the UE cannot receive a unicast service and an MBMS service at the same time, the connection release indication message is sent to the UE; or if the UE can receive a unicast service and an MBMS service at the same time, the connection release indication message is not sent. For example, if a priority of the MBMS service data of a to-be-transmitted MBMS service is higher than a priority of a unicast service or an MBMS service being currently transmitted, the base station may initiate a connection release procedure to instruct the UE to release a current unicast connection or terminate the current unicast or service. In a message for releasing the unicast connection or terminating the current unicast service, the UE may be instructed to release the connection or terminate the unicast service, and the UE may be instructed to receive the MBMS service.

The connection release indication message is used to instruct the UE to release the current unicast connection or terminate the current unicast or service. In the message for releasing the unicast connection or terminating the current unicast service, the UE may be instructed to release the connection or terminate the unicast service, and the UE may be instructed to receive the MBMS service. The connection release indication message may further include: a transceiving manner of an MBMS service, identifier information of an MBMS service, priority information of an MBMS service, service provider information of an MBMS service, and the like; specific content is similar to that in the MBMS service paging message, and details are not described herein again.

It should be noted that, when the UE is in an RRC connected state, or is transmitting a unicast service or an MBMS service, it may be considered that the base station can acquire the receiving capability of the UE, where the base station may actively initiate a query on the receiving capability of the UE, or the receiving capability of the UE may be carried in a message sent by the UE to the base station.

S103. The base station sends the MBMS service data to the UE according to the MBMS service transmission request.

Specifically, after receiving the MBMS service transmission request, the base station may configure MBMS configuration information and send the MBMS configuration information and the MBMS service data to the UE. The UE may receive the MBMS service data according to the MBMS configuration information.

The foregoing MBMS configuration information may further include an MBMS control channel MCCH resource configuration message. The UE may acquire corresponding MCCH information according to the MCCH resource configuration message, and receive the MBMS service data from a resource location corresponding to the MCCH information.

When a network needs to instruct the UE to receive an MBMS service that is temporarily initiated, for example, to push a piece of big news, an MBMS service transmission request and corresponding MBMS service data may be sent by using the core network device. That is, the network initiates a dynamic notification message, and after receiving the request or the data, the base station initiates paging or sends an update message to the UE after receiving, so that the UE can receive, in time, the dynamic notification message initiated by the network.

It should be noted that, after sending the MBMS service paging message or the MBMS service update message, the base station may receive a receiving acknowledgement message that is of an MBMS service and sent by a UE that is in a state of connected to the base station; the base station may determine, according to the received receiving acknowledgement message of an MBMS service, a quantity of UEs corresponding to a same MBMS service in the cell served by the base station, and further configure a transmission manner of an MBMS service according to the quantity of UEs.

The UE sends the receiving acknowledgement message of an MBMS service to the base station, where the receiving acknowledgement message includes information that indicates that the MBMS service data is to be received by the UE; for example, the UE may send the receiving acknowledgement message of an MBMS service to indicate that the UE is to receive the MBMS service. If the paging message includes multiple MBMS service indications, the UE may also indicate, for the base station, a receiving acknowledgement message of one or more (to-be-received) MBMS services in which the UE are interested. That is, the receiving acknowledgement message of an MBMS service includes information that indicates that the MBMS service data is to be received by the UE, the acknowledgement message fed back by the UE carries an indication, similar to a call, of receiving a service, which indicates an MBMS service or MBMS services to be received by the UE. The base station determines, according to particular service statistics and based on a same MBMS service, a quantity of corresponding UEs.

Specifically, the base station first determines whether the quantity of UEs exceeds a preset threshold; and if the quantity of UEs exceeds the preset threshold, the base station configures and uses a broadcast or multicast manner to transmit the MBMS service data to the UE; or if the quantity of UEs does not exceed the preset threshold, the base station configures and uses a unicast manner to transmit the MBMS service data to the UE.

After a connection between the base station and the UE is established, the base station may actively send an MBMS service capability query request message to the UE and receive MBMS service capability information fed back by the UE, and may further send MBMS service support information to the core network device.

The MBMS service capability information includes information such as a transmission capability of the UE, a transceiving manner that is of an MBMS service and supported by the UE, and/or identifier information that is of an MBMS service and that the UE allows to receive.

The transmission capability of the UE includes: support only for a unicast transmission manner, support only for a multicast transmission manner, support for a unicast transmission manner or a multicast transmission manner, and support for transmission in both a unicast transmission manner and a multicast transmission manner at the same time.

The transceiving manner that is of an MBMS service and supported by the UE may include but is not limited to the following: whether the UE supports an MBMS service triggered by the network, for example, a Network triggered on demand MBMS service; whether the UE supports an MBMS service actively initiated by the UE; whether the UE supports receiving of multiple MBMS services at the same time; and whether the UE supports receiving of a unicast service and an MBMS service at the same time.

The identifier information that is of an MBMS service and that the UE allows to receive may include but is not limited to: a service identifier of an MBMS service that can be received by the UE, a service area identifier of an MBMS service that can be received by the UE, a service session identifier of an MBMS service that can be received by the UE, and a service type identifier of an MBMS service that can be received by the UE, and the like.

In addition, before S101, the base station may configure, by receiving information configured by an operation management system OAM, an MBMS service that is supported. Specifically, the base station first receives MBMS support configuration information configured by the OAM, where the MBMS support configuration information is used to indicate a configuration required to transmit the MBMS service data, and then performs configuration according to the MBMS support configuration information.

The MBMS support configuration information may include but is not limited to:

an identifier of an MBMS service area supported by the base station;

an identifier list of MBMS service areas supported by the base station;

an identifier of an MBMS service supported by the base station;

whether the base station supports MBMS on Demand service transmission initiated by the network;

whether the base station supports MBMS on Demand service transmission initiated by the UE;

an MBMS cell type supported by the base station; and a cell type corresponding to an identifier of an MBMS service supported by the base station.

During application, a transmission capability that is of an MBMS service and supported by the base station is configured by using the OAM according to an actual requirement.

Embodiment 2

In this embodiment, a UE and a base station are in an RRC idle (RRC_IDLE) state, and the following describes a process of responding when the UE in such a state receives an MBMS service notification message.

Figure 3:
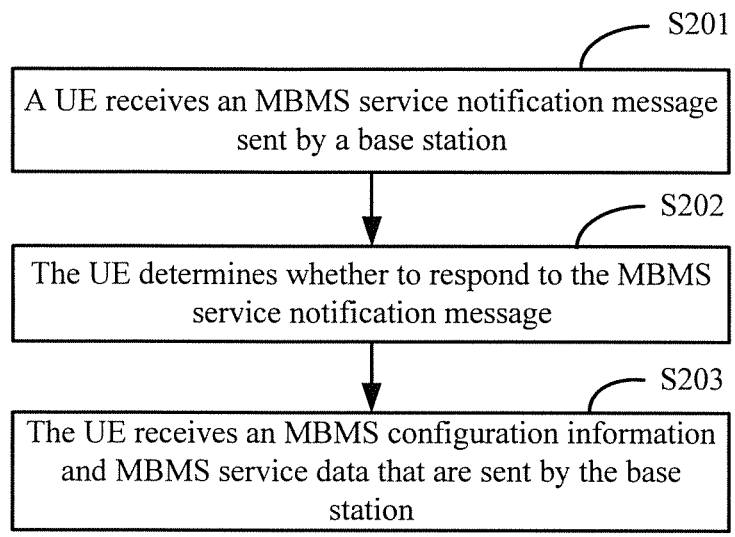
FIG. 3 is a flowchart of a data transmission method according to Embodiment 2 of the present invention.

FIG. 3 is a flowchart of a data transmission method according to this embodiment. As shown in FIG. 3, the data transmission method in the present invention includes:

S201. A UE receives a MBMS service notification message sent by a base station.

The MBMS service notification message received by the UE in the RRC idle state includes: an MBMS service paging message, an MBMS service update message, a base station broadcast message, or the like. If the base station sends an MBMS service paging message, the UE receives the MBMS service paging message; if the base station sends an MBMS service update message, the UE receives the MBMS service update message.

S202. The UE determines whether to respond to the MBMS service notification message.

Case 1:

After receiving the MBMS service paging message, the UE determines whether the paging message needs to be responded to, that is, determines whether the current paging message instructs the UE to receive content of an MBMS service. When the MBMS service paging message includes an identifier related to the UE, the UE responds to the MBMS service paging message.

Specifically, the identifier related to the UE may include but is not limited to: a UE identifier that matches an identifier of the UE itself, a UE group identifier that matches an identifier of a group to which the UE itself belongs, an MBMS service identifier that matches an MBMS service in which the UE itself is interested, or an MBMS session identifier that matches an identifier of an MBMS session in which the UE itself is interested.

Generally, the UE may also receive subscription information from an MBMS subscription server, set a range of the identifier related to the UE, and store corresponding service information in a terminal.

If the MBMS service paging message indicates a broadcast or multicast manner, the UE gets prepared to receive the MBMS service; or the UE may first establish a connection with the base station, and then get prepared to receive the MBMS service.

If the MBMS service paging message indicates a unicast manner, the UE first establishes a connection with the base station, and then gets prepared to receive the MBMS service.

Specifically, that the UE establishes a connection with the base station includes that: the UE sends a random access pilot signal to the base station, and successfully accesses the base station; or the UE sends a radio resource control RRC connection establishment request to the base station, and establishes an RRC connection with the base station. For a UE that has not successfully accessed the base station, an RRC connection establishment request needs to be sent to the base station after random access is successful, so as to initiate an RRC connection; for a UE that has successfully accessed the base station, an RRC connection is directly initiated.

For example, the UE sends an RRC connection request, where the request message may include that the connection request is triggered because of MBMS service paging. Specifically, a cause value of the request may be carried in the request message, for example, a downlink MBMS service (mt-MBMS). The cause value helps the base station provide a preferential access service for the UE, or directly refuse the access request when the base station cannot provide the service. After the UE establishes the RRC connection, the MBMS service may be transmitted in a multicast manner; therefore, an extra overhead of base station resources is not large.

Case 2:

When the UE receives the MBMS service update message sent by the base station, the UE gets prepared to receive MBMS configuration information broadcasted by a system, so as to acquire the latest MBMS configuration information.

S203. The UE receives MBMS configuration information and MBMS service data that are sent by the base station.

S203 specifically includes: S2031. The UE receives the MBMS configuration information sent by the base station.

The MBMS configuration information includes an MCCH resource configuration message. Optionally, for a newly added MBMS service, that the MBMS service is an MBMS-on-Demand service may be indicated in the MBMS configuration information broadcasted by the system.

S2032. The UE receives corresponding MCCH information according to an MCCH resource configuration message.

After receiving the MCCH information, the UE may acquire a resource location in which the MBMS service data that needs to be received is located.

S2033. The UE receives the MBMS service data from a resource location corresponding to the MCCH information.

It should be noted that, generally, after receiving, in S2031 of S203, the MBMS configuration information sent by the base station, the UE further listens on whether the MBMS configuration information includes an MCCH change notification message. When the UE receives the MCCH change notification message, the UE stops receiving the MCCH information corresponding to the MCCH resource configuration information; and receives, in a next modification period of MCCH information, the MCCH information corresponding to the MCCH resource configuration information, and then performs S2032 and S2033 again.

In this embodiment, when there is a dynamic message in a network, a paging message or an update message is sent to a UE in an idle state, so that the UE can receive or update corresponding MBMS service data, and can receive the dynamic message in time.

Embodiment 3

In this embodiment, a UE and a base station are in an RRC connected (RRC_CONNECTED) state, and the following describes a process of responding when the UE in such a state receives an MBMS service notification message.

Figure 4:
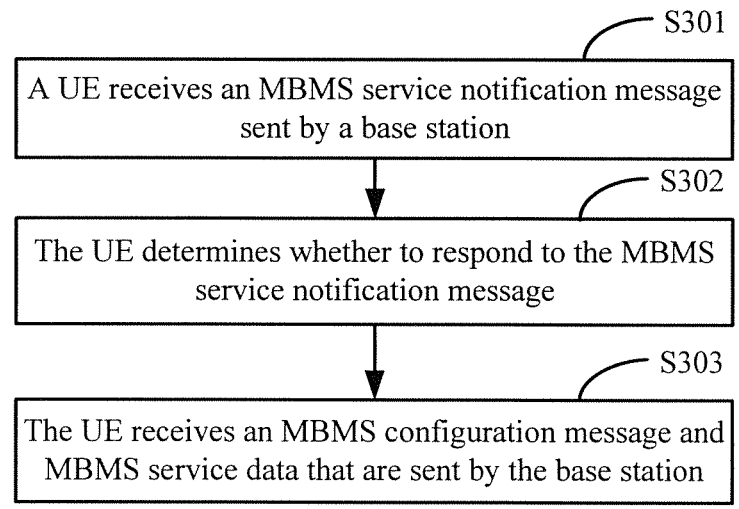
FIG. 4 is a flowchart of a data transmission method according to Embodiment 3 of the present invention.

FIG. 4 is a flowchart of a data transmission method according to this embodiment. As shown in FIG. 4, the data transmission method in the present invention includes:

S301. A UE receives an MBMS service notification message sent by a base station.

The MBMS service notification message received by the UE in the RRC idle state includes: an MBMS service paging message, an MBMS service update message, a connection release indication message, a base station broadcast message, or the like. If the MBMS service notification message sent by the base station is an MBMS service paging message, the UE receives the MBMS service paging message; if the MBMS service notification message sent by the base station is an MBMS service update message, the UE receives the MBMS service update message; if the MBMS service notification message sent by the base station is a connection release indication message, the UE receives the connection release indication message.

S302. The UE determines whether to respond to the MBMS service notification message.

If the UE receives the MBMS service paging message, the MBMS service notification message to which the UE responds is the MBMS service paging message; if the UE receives the MBMS service update message, the MBMS service notification message to which the UE responds is the MBMS service update message; if the UE receives the connection release indication message, the MBMS service notification message to which the UE responds is the connection release indication message.

Case 1:

After receiving the MBMS service paging message, the UE determines whether the paging message needs to be responded to, that is, determines whether the current paging message instructs the UE to receive content of a service. When the MBMS service paging message includes an identifier related to the UE, the UE responds to the MBMS service paging message.

The UE determines, according to a receiving capability of the UE or a priority that is corresponding to an MBMS service and is in the MBMS service paging message, whether to receive the MBMS service data; and if it is determined that the MBMS service data needs to be received, goes to S303.

Specifically, if the UE has a capability of receiving a unicast service and the MBMS service data at the same time, the UE gets prepared to receive a unicast service and the MBMS service data at the same time.

If the UE does not have a capability of receiving a unicast service and the MBMS service data at the same time, the UE determines whether a priority of a unicast service or an MBMS service being transmitted by the UE is higher than a priority of the MBMS service data; and if the priority of the unicast service or the MBMS service being transmitted is higher than the priority of the MBMS service data, continues to receive the unicast service or the MBMS service being transmitted; or if the priority of the unicast service or the MBMS service being transmitted is not higher than the priority of the MBMS service data, receives the MBMS service data. If a unicast service is being transmitted, the UE compares a priority of the unicast service being transmitted with the priority of the MBMS service data. If an MBMS service is being transmitted, the UE compares a priority of the MBMS service being transmitted with the priority of the MBMS service data.

For example, when a piece of temporary news needs to be pushed in a network, the base station sends a paging message, where the paging message includes priority information of an MBMS service. When the UE receives the MBMS service, if the UE is performing a downloading operation, where generally, a priority of downloading is relatively lower, the UE suspends the operation of downing, and gets prepared to receive the piece of temporary news. However, if the UE is being on a call, where generally, a priority of a call is highest, the UE receives the piece of temporary news, and continues to be on the call.

Case 2:

When the UE receives the MBMS service update message, the UE starts to receive MBMS configuration information broadcasted by a system, so as to acquire the updated MBMS configuration information.

The UE determines, according to a receiving capability of the UE or a priority that is corresponding to an MBMS service and is in the MBMS service paging message, whether to receive the MBMS service data; and if it is determined that the MBMS service data needs to be received, goes to S303. A specific determining process is the same as that in Case 1, and details are not described herein again.

Case 3:

If the UE is transmitting a unicast service or an MBMS service, or is in an RRC connected state, the UE may further receive the connection release indication message sent by the base station. The connection release indication message includes: information of instructing the UE to release a current unicast connection or terminate a current unicast service, information of instructing the UE to receive MBMS configuration information and MBMS service data, a transceiving manner of an MBMS service, identifier information of an MBMS service, priority information of an MBMS service, service provider information of an MBMS service, and the like. When the UE receives the connection release indication message sent by the base station, the UE releases a current unicast connection or terminates the current unicast service, and receives MBMS configuration information and MBMS service data that are sent by the base station.

S303. The UE receives MBMS configuration information and MBMS service data that are sent by the base station.

The foregoing S303 is corresponding to and the same as the S203 in Embodiment 2, and details are not described herein again.

In this embodiment, when there is a dynamic message in a network, a paging message, an update message, or a connection release indication message is sent to a UE in a connected state, so that the UE can determine, according to a capability of the UE or a priority, to receive or update corresponding MBMS service data, and can receive an important dynamic message in time.

It should be noted that, in Embodiment 2 and Embodiment 3, after the UE and the base station are in a connected state, and after receiving the MBMS service paging message or the MBMS service update message and determining to respond to the message, the UE may send a receiving acknowledgement message of an MBMS service to the base station, where the receiving acknowledgement message of an MBMS service includes information such as information that indicates an MBMS service in which the UE is interested.

In addition, after receiving an MBMS service capability query request message sent by the base station, the UE feeds back MBMS service capability information to the base station. The MBMS service capability information includes information such as a transmission capability of the UE, a transceiving manner that is of an MBMS service and supported by the UE, and/or identifier information that is of an MBMS service and that the UE allows to receive.

The transmission capability of the UE includes: support only for a unicast transmission manner, support only for a multicast transmission manner, support for a unicast transmission manner or a multicast transmission manner, and support for transmission in both a unicast transmission manner and a multicast transmission manner at the same time.

The transceiving manner that is of an MBMS service and supported by the UE may include but is not limited to the following: whether the UE supports an MBMS service triggered by a network, for example, a Network triggered on demand MBMS service; whether the UE supports an MBMS service actively initiated by the UE; whether the UE supports receiving of multiple MBMS services at the same time; and whether the UE supports receiving of a unicast service and an MBMS service at the same time.

The identifier information that is of an MBMS service and that the UE allows to receive may include but is not limited to: a service identifier of an MBMS service that can be received by the UE, a service area identifier of an MBMS service that can be received by the UE, a service session identifier of an MBMS service that can be received by the UE, and a service type identifier of an MBMS service that can be received by the UE, and the like.

In general, a UE performs a corresponding processing operation according to a received MBMS service notification message sent by a base station, so that the UE can receive, in time, an MBMS service that needs to be received.

The foregoing is a detailed description of the data transmission method provided in the present invention. The following describes a data transmission apparatus provided in the present invention in detail.

Embodiment 4

Figure 5:
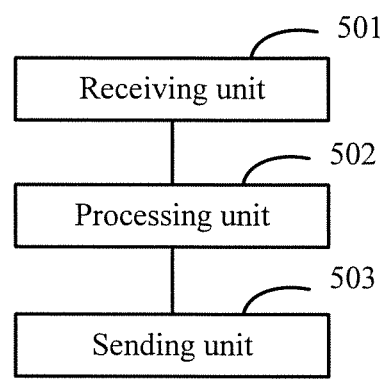
FIG. 5 is a schematic structural diagram of a base station according to Embodiment 4 of the present invention.

FIG. 5 is a schematic diagram of a data transmission apparatus according to this embodiment. As shown in FIG. 5, the data transmission apparatus in the present invention includes: a receiving unit 501, a processing unit 502, and a sending unit 503.

The receiving unit 501 is configured to receive a Multimedia Broadcast Multicast Service MBMS service transmission request and MBMS service data that are sent by a core network device.

When the core network device, such as an MME, needs to transmit the MBMS service data, generally, the core network device first sends an MBMS service transmission request to a base station, and then sends the MBMS service data. The receiving unit 501 receives the corresponding MBMS service transmission request and MBMS service data.

The processing unit 502 is configured to: when the receiving unit 501 receives the MBMS service transmission request or the MBMS service data, instruct the sending unit 503 to send an MBMS service notification message in a cell served by the base station.

The sending unit 503 is configured to receive an instruction of the processing unit 502, and send the MBMS service notification message in the cell served by the base station.

The processing unit 502 instructs, when the receiving unit 501 receives the MBMS service transmission request, the sending unit 503 to send the MBMS service notification message in the cell served by the base station; or instructs, only when the receiving unit 501 receives the MBMS service data, the sending unit 503 to send the MBMS service notification message in the cell served by the base station. The MBMS service notification message is used to instruct a UE to receive or get prepared to receive an MBMS service.

The MBMS service receiving notification message includes an MBMS service paging message, an MBMS service update message, a base station broadcast message, a connection release indication message, or the like.

Optionally, the processing unit 502 may instruct the sending unit 503 to send an MBMS service paging message in the cell served by the base station, or send an MBMS service update message in the cell served by the base station; or the sending unit 503 may send a connection release indication message when the processing unit 502 determines that a UE that needs to receive the MBMS service data is in an RRC connected state or is transmitting a unicast service. A specific MBMS service receiving notification message that is sent may be configured according to an actual application requirement.

Content of the MBMS service paging message may be set according to a requirement in an actual application scenario, and is generally set according to the received MBMS service transmission request or MBMS service data. Specifically, the MBMS service paging message may include but is not limited to: a transceiving manner of an MBMS service, identifier information of an MBMS service, priority information of an MBMS service, and service provider information of an MBMS service, and the like.

The identifier information of an MBMS service includes: identifier information of a UE that receives an MBMS service, a group identifier information of a UE that receives an MBMS service, an MBMS service type, an MBMS service identifier, an MBMS service group identifier, an MBMS service session identifier, a single frequency network area identifier of an MBMS service, a service area identifier of an MBMS service, and the like. Specifically, the identifier information of a UE that receives an MBMS service may include an identifier of a UE that currently needs to receive an MBMS service, or an identifier list of UEs that currently need to receive an MBMS service. The group identifier information of a UE that receives an MBMS service may include a group identifier of a UE that currently needs to receive an MBMS service, or a group identifier list of UEs that currently need to receive an MBMS service. The type of an MBMS service to be received by the UE may include: a video, audio, a data file, a software update, and the like. The service provider information of an MBMS service may include: a service provider identifier, a content provider identifier, and the like.

The transceiving manner of an MBMS service may include: a sending manner of an MBMS service to be received by the UE, such as an MBMS service (MBMS on Demand) based on a user request, and an MT MBMS service; and a receiving manner of the MBMS service to be received by the UE, such as an MBMS receiving manner, a unicast Unicast receiving manner, and a combination of Unicast and MBMS.

The priority information of the MBMS service to be received by the UE may include: a priority identifier of a unicast service and/or a priority identifier of another multicast service.

The MBMS service update message is used to indicate that MBMS service content and/or MBMS service resource distribution of a current cell changes, so that the UE that needs to receive the MBMS service updates the MBMS configuration information.

It should be noted that, when the sending unit 503 sends the MBMS service update message in the cell served by the base station, a ValTag that is used to indicate a system message change and is in a base station broadcast message may be made unchanged, to prevent another UE from updating a system broadcast, which avoids an unnecessary update operation performed on the system broadcast by a terminal. That is, when the ValTag remains unchanged, if the UE does not perform corresponding MBMS service data transmission, no update operation is performed on the system broadcast.

If the processing unit 502 determines that the UE that needs to receive the corresponding MBMS service data is in an RRC connected state, or is transmitting a unicast service or an MBMS service, the processing unit 502 may determine, according to a receiving capability of the UE, whether the UE can receive a unicast service and an MBMS service at the same time; and if the UE cannot receive a unicast service and an MBMS service at the same time, the sending unit 503 sends the connection release indication message to the UE; or if the UE can receive a unicast service and an MBMS service at the same time, the sending unit 503 does not send the connection release indication message. For example, if a priority of the MBMS service data is higher than a priority of a unicast service or an MBMS service being currently transmitted, the processing unit 502 may initiate a connection release procedure to instruct the UE to release a current unicast connection or terminate the current unicast or service. In a message for releasing the unicast connection or terminating the current unicast service, the UE may be instructed to release the connection or terminate the unicast service, and the UE may be instructed to receive the MBMS service.

The connection release indication message is used to instruct the UE to release the current unicast connection or terminate the current unicast or service. In the message for releasing the unicast connection or terminating the current unicast service, the UE may be instructed to release the connection or terminate the unicast service, and the UE may be instructed to receive the MBMS service. The connection release indication message may further include: a transceiving manner of an MBMS service, identifier information of an MBMS service, priority information of an MBMS service, service provider information of an MBMS service, and the like; specific content is similar to that in the MBMS service paging message, and details are not described herein again.

It should be noted that, when the UE is in an RRC connected state, or is transmitting a unicast service or an MBMS service, it may be considered that the base station can acquire the receiving capability of the UE, where the base station may actively initiate a query on the receiving capability of the UE, or the receiving capability of the UE may be carried in a message sent by the UE to the base station.

The processing unit 502 is further configured to configure MBMS configuration information according to the MBMS service transmission request.

The MBMS configuration information includes an MBMS control channel MCCH resource configuration message. The UE may acquire corresponding MCCH information according to the MCCH resource configuration message, and receive the MBMS service data from a corresponding resource location.

The sending unit 503 is further configured to send, to the UE, the MBMS configuration information obtained by the processing unit 502 and the MBMS service data received by the receiving unit 501.

The UE receives the corresponding MCCH information according to the MCCH resource configuration message, and receives the MBMS service data from the resource location corresponding to the MCCH information.

When a network needs to instruct the UE to receive an MBMS service that is temporarily initiated, for example, to push a piece of big news, an MBMS service transmission request and corresponding MBMS service data may be sent by using the core network device. That is, the network initiates a dynamic notification message, and when the receiving unit 501 receives the request or the data, the sending unit 503 initiates paging or sends an update message to the UE, so that the UE can receive, in time, the dynamic notification message initiated by the network.

It should be noted that, after the sending unit 503 sends the MBMS service paging message or the MBMS service update message, the receiving unit 501 may receive a receiving acknowledgement message that is of an MBMS service and sent by a UE that in a state of connected to the UE; the processing unit 502 may determine, according to the received receiving acknowledgement message of an MBMS service, a quantity of UEs corresponding to a same MBMS service in the cell served by the base station, and further configure a transmission manner of an MBMS service according to the quantity of UEs.

The UE sends the receiving acknowledgement message of an MBMS service to the base station, where the receiving acknowledgement message includes information that indicates that the MBMS service data is to be received by the UE; for example, the UE may send the receiving acknowledgement message of an MBMS service to indicate that the UE is to receive the MBMS service. If the paging message includes an indication of multiple MBMS services, the UE may also indicate, for the base station, a receiving acknowledgement message of one or more MBMS services in which the UE are interested. That is, the receiving acknowledgement message of an MBMS service includes information used to indicate an MBMS service that can be received by the UE; the acknowledgement message fed back by the UE carries an indication, similar to a call, of receiving a service, which indicates an MBMS service or MBMS services to be received by the UE. The base station determines, according to particular service statistics and based on a same MBMS service, a quantity of corresponding UEs.

Specifically, the processing unit 502 first determines whether the quantity of UEs exceeds a preset threshold; and if the quantity of UEs exceeds the preset threshold, the processing unit 502 configures and uses a broadcast or multicast manner to transmit the MBMS service data to the UE; or if the quantity of UEs does not exceed the preset threshold, the processing unit 502 configures and uses a unicast manner to transmit the MBMS service data to the UE.

After a connection between the base station and the UE is established, the processing unit 502 may also actively send an MBMS service capability query request message to the UE by using the sending unit 503, the receiving unit 501 receives MBMS service capability information fed back by the UE, and further, the MBMS service capability information may be fed back to the core network device by using the sending unit 503.

The MBMS service capability information includes information such as a transmission capability of the UE, a transceiving manner that is of an MBMS service and supported by the UE, and/or identifier information that is of an MBMS service and that the UE allows to receive.

The transmission capability of the UE includes: support only for a unicast transmission manner, support only for a multicast transmission manner, support for a unicast transmission manner or a multicast transmission manner, and support for transmission in both a unicast transmission manner and a multicast transmission manner at the same time.

The transceiving manner that is of an MBMS service and supported by the UE may include but is not limited to the following: whether the UE supports an MBMS service triggered by the network, for example, a Network triggered on demand MBMS service; whether the UE supports an MBMS service actively initiated by the UE; whether the UE supports receiving of multiple MBMS services at the same time; and whether the UE supports receiving of a unicast service and an MBMS service at the same time.

The identifier information that is of an MBMS service and that the UE allows to receive may include but is not limited to: a service identifier of an MBMS service that can be received by the UE, a service area identifier of an MBMS service that can be received by the UE, a service session identifier of an MBMS service that can be received by the UE, and a service type identifier of an MBMS service that can be received by the UE, and the like.

In addition, the base station in the present invention may configure, by receiving information configured by an OAM, an MBMS service that is supported. Specifically, the receiving unit 501 first receives MBMS support configuration information configured by the OAM, and the processing unit 502 performs configuration according to the MBMS support configuration information.

The MBMS support configuration information may include but is not limited to:

an identifier of an MBMS service area supported by the base station;

an identifier list of MBMS service areas supported by the base station;

an identifier of an MBMS service supported by the base station;

whether the base station supports MBMS on Demand service transmission initiated by the network;

whether the base station supports MBMS on Demand service transmission initiated by the UE;

an MBMS cell type supported by the base station; and a cell type corresponding to an identifier of an MBMS service supported by the base station.

During application, a transmission capability that is of an MBMS service and supported by the base station is configured by using the OAM according to an actual requirement.

Embodiment 5

Figure 6:
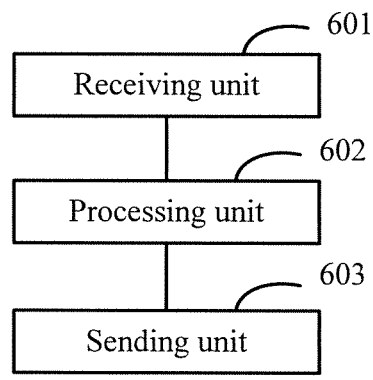
FIG. 6 is a schematic structural diagram of user equipment according to Embodiment 5 of the present invention.

FIG. 6 is a schematic structural diagram of user equipment according to this embodiment of the present invention. As shown in FIG. 6, the user equipment in this embodiment of the present invention includes: a receiving unit 601, a processing unit 602, and a sending unit 603.

If the user equipment and a base station are in an RRC idle (RRC_IDLE) state, functions and work processes of the modules are as follows:

The receiving unit 601 is configured to receive an MBMS service notification message sent by the base station.

The MBMS service notification message received by the receiving unit 601 in the RRC idle state includes: an MBMS service paging message, an MBMS service update message, a base station broadcast message, or the like. If the base station sends an MBMS service paging message, the receiving unit 601 receives the MBMS service paging message; if the base station sends an MBMS service update message, the receiving unit 601 receives the MBMS service update message.

The processing unit 602 is configured to determine whether to respond to the MBMS service notification message.

Case 1:

When the receiving unit 601 receives the MBMS service paging message, if the MBMS service paging message includes an identifier related to the UE, the processing unit 602 responds to the MBMS service paging message.

Specifically, the identifier related to the UE may include but is not limited to: a UE identifier that matches an identifier of the UE, a UE group identifier that matches an identifier of a group to which the UE belongs, an MBMS service identifier that matches an MBMS service in which the UE is interested, or an MBMS session identifier that matches an identifier of an MBMS session in which the UE is interested.

If the MBMS service paging message indicates a broadcast or multicast manner, the processing unit 602 gets prepared to receive an MBMS service; or the processing unit 602 may first establish a connection with the base station, and then get prepared to receive an MBMS service.

If the MBMS service paging message indicates a unicast manner, the processing unit 602 first establishes a connection with the base station, and then gets prepared to receive an MBMS service.

Specifically, that the processing unit 602 establishes a connection with the base station includes: sending a random access pilot signal to the base station by using the sending unit 603, and successfully accessing the base station; or sending an RRC connection establishment request to the base station by using the sending unit 603, and establishing an RRC connection with the base station. Generally, for a UE that has not successfully accessed the base station, the sending unit 603 generally needs to send an RRC connection establishment request to the base station after random access succeeds, so as to initiate an RRC connection; for a UE that has successfully accessed the base station, the sending unit 603 directly initiates an RRC connection.

Case 2:

When the receiving unit 601 receives the MBMS service update message sent by the base station, the processing unit 602 gets prepared to receive, by using the receiving unit 601, MBMS configuration information broadcasted by a system, so as to acquire the latest MBMS configuration information.

The receiving unit 601 is further configured to receive MBMS configuration information and MBMS service data that are sent by the base station.

The MBMS configuration information includes an MCCH resource configuration message. Optionally, for a newly added MBMS service, that the MBMS service is an MBMS-on-Demand service may be indicated in the MBMS configuration information broadcasted by the system.

The processing unit 602 is further configured to receive corresponding MCCH information according to the MCCH resource configuration message received by the receiving unit, and receive the MBMS service data from a resource location corresponding to the MCCH information.

When the receiving unit 601 receives the MCCH information, the processing unit 602 may acquire the resource location in which the MBMS service data that needs to be received is located, and further, receive the MBMS service data from the resource location corresponding to the MCCH information.

It should be noted that the processing unit 602 further listens on whether the MBMS configuration information includes an MCCH change notification message. When the receiving unit 601 receives the MCCH change notification message, the processing unit 602 stops receiving the MCCH information corresponding to the MCCH resource configuration information; and receives, in a next modification period of MCCH information, the MCCH information corresponding to the MCCH resource configuration information.

If the user equipment and a base station are in an RRC connected (RRC_CONNECTED) state, functions and work processes of the modules are as follows:

An MBMS service notification message received by the receiving unit 601 in an RRC idle state includes: an MBMS service paging message, an MBMS service update message, a connection release indication message, a base station broadcast message, or the like. If the base station sends an MBMS service paging message, the receiving unit 601 receives the MBMS service paging message; if the base station sends an MBMS service update message, the receiving unit 601 receives the MBMS service update message; if the base station sends a connection release indication message, the receiving unit 601 receives the connection release indication message.

If the receiving unit 601 receives the MBMS service paging message, the MBMS service notification message to which the processing unit 602 responds is the MBMS service paging message; if the receiving unit 601 receives the MBMS service update message, the MBMS service notification message to which the processing unit 602 responds is the MBMS service update message; if the receiving unit 601 receives the connection release indication message, the MBMS service notification message to which the processing unit 602 responds is the connection release indication message.

Case 1:

When the receiving unit 601 receives the MBMS service paging message, the processing unit 602 determines whether the paging message needs to be responded to. If the MBMS service paging message includes an identifier related to the UE, the processing unit 602 responds to the MBMS service paging message.

The processing unit 602 determines, according to a receiving capability of the UE or a priority that is corresponding to an MBMS service and is in the MBMS service paging message, whether to receive the MBMS service data; if it is determined that the MBMS service data needs to be received, the processing unit 602 receives, by using the receiving unit 601, the MBMS configuration information and the MBMS service data that are sent by the base station.

Specifically, if the processing unit 602 has a capability of receiving a unicast service and the MBMS service data at the same time, the processing unit 602 gets prepared to receive a unicast service and the MBMS service data at the same time.

If the processing unit 602 does not have a capability of receiving a unicast service and the MBMS service data at the same time, the processing unit 602 determines whether a priority of a unicast service or an MBMS service being transmitted is higher than a priority of the MBMS service data; and if the priority of the unicast service or the MBMS service being transmitted is higher than the priority of the MBMS service data, the processing unit 602 continues to receive, by using the receiving unit 601, the unicast service or the MBMS service being transmitted; or if the priority of the unicast service or the MBMS service being transmitted is not higher than the priority of the MBMS service data, receive the MBMS service data by using the receiving unit 601. If a unicast service is being transmitted, the processing unit 602 compares a priority of the unicast service being transmitted with the priority of the MBMS service data. If an MBMS service is being transmitted, the processing unit 602 compares a priority of the MBMS service being transmitted with the priority of the MBMS service data.

Case 2:

When the receiving unit 601 receives the MBMS service update message, the processing unit 602 determines whether the update message needs to be responded to. If the MBMS service update message includes an identifier related to the UE, the processing unit 602 responds to the MBMS service update message. Specifically, the processing unit 602 instructs the receiving unit 601 to start to receive MBMS configuration information broadcasted by a system, so as to acquire the updated MBMS configuration information.

The processing unit 602 determines, according to a receiving capability of the UE or a priority that is corresponding to an MBMS service and is in the MBMS service paging message, whether to receive the MBMS service data; if it is determined that the MBMS service data needs to be received, the processing unit 602 instructs the receiving unit 601 to receive the MBMS configuration information and the MBMS service data. A specific determining process is the same as that in Case 1, and details are not described herein again.

Case 3:

If the UE is transmitting a unicast service or an MBMS service, or is in an RRC connected state, the receiving unit 601 may further receive the connection release indication message sent by the base station. The connection release indication message is a message used by the base station to instruct the UE to release a current unicast connection or terminate a current unicast service, and includes: information of instructing the UE to release a current unicast connection or terminate a current unicast service, information of instructing the UE to receive MBMS configuration information and MBMS service data, a transceiving manner of an MBMS service, identifier information of an MBMS service, priority information of an MBMS service, service provider information of an MBMS service, and the like. When the receiving unit 601 receives the connection release indication message sent by the base station, the processing unit 602 releases a current unicast connection or terminates the current unicast service, and instructs the receiving unit 601 to receive MBMS configuration information and MBMS service data that are sent by the base station.

After the receiving unit 601 receives the MBMS configuration information and the MBMS service data, a processing manner of the processing unit 602 is the same as that when the UE is in the RRC idle state, and details are not described herein again.

When there is a dynamic message in a network, a paging message, an update message, or a connection release indication message is sent to a UE in a connected state, so that the UE can determine, according to a capability of the UE or a priority, to receive or update corresponding MBMS service data, and can receive an important dynamic message in time.

After the UE and the base station are in a connected state, and when the receiving unit 601 receives the MBMS service paging message or the MBMS service update message, and the processing unit 602 determines to respond to the message, the processing unit 602 may send a receiving acknowledgement message of an MBMS service to the base station by using the sending unit 603, where the receiving acknowledgement message of an MBMS service includes information such as information that indicates an MBMS service in which the UE is interested.

In addition, when the receiving unit 601 receives an MBMS service capability query request message sent by the base station, the processing unit 602 feeds back MBMS service capability information of the UE to the base station by using the sending unit 603. The MBMS service capability information includes information such as a transmission capability of the UE, a transceiving manner that is of an MBMS service and supported by the UE, and/or identifier information that is of an MBMS service and that the UE allows to receive.

The transmission capability of the UE includes: support only for a unicast transmission manner, support only for a multicast transmission manner, support for a unicast transmission manner or a multicast transmission manner, and support for transmission in both a unicast transmission manner and a multicast transmission manner at the same time.

The transceiving manner that is of an MBMS service and supported by the UE may include but is not limited to the following: whether the UE supports an MBMS service triggered by the network, for example, a Network triggered on demand MBMS service; whether the UE supports an MBMS service actively initiated by the UE; whether the UE supports receiving of multiple MBMS services at the same time; and whether the UE supports receiving of a unicast service and an MBMS service at the same time.

The identifier information that is of an MBMS service and that the UE allows to receive may include but is not limited to: a service identifier of an MBMS service that can be received by the UE, a service area identifier of an MBMS service that can be received by the UE, a service session identifier of an MBMS service that can be received by the UE, and a service type identifier of an MBMS service that can be received by the UE, and the like.

In general, the user equipment in the present invention performs a corresponding processing operation according to a received MBMS service notification message sent by a base station, so that the UE can receive, in time, an MBMS service that needs to be received.

Embodiment 6

Figure 7:
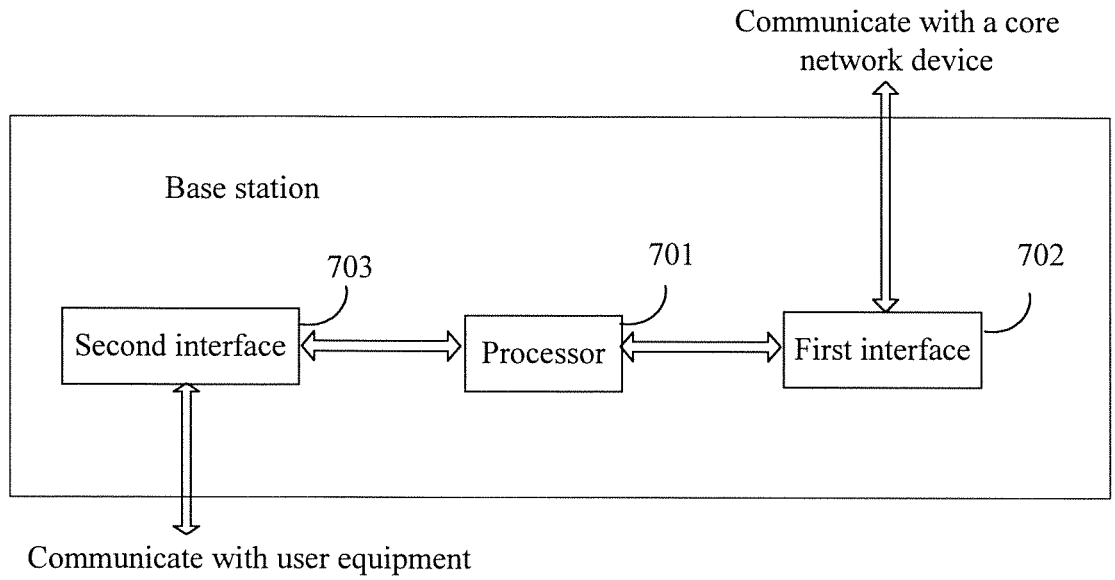
FIG. 7 is a schematic diagram of a composition structure of a base station according to Embodiment 6 of the present invention.

FIG. 7 is a schematic diagram of a composition structure of a base station according to this embodiment of the present invention. As shown in FIG. 7, the base station in this embodiment of the present invention may include:

a processor 701, a first interface 702, and a second interface 703.

The processor 701 may be a single-core or multi-core central processing unit (Central Processing Unit, CPU), or an application-specific integrated circuit (Application Specific Integrated Circuit, ASIC), or be configured as one or more integrated circuits that implement this embodiment of the present invention.

The first interface 702 is configured to interact with a core network device.

The second interface 703 is configured to interact with user equipment UE.

The processor 701 is configured to:

receive, through the first interface 702, an MBMS service transmission request and MBMS service data that are sent by the core network device;

after receiving the MBMS service transmission request or the MBMS service data, send, through the second interface 703, an MBMS service notification message in a cell served by the base station;

configure MBMS configuration information according to the MBMS service transmission request; and send the MBMS configuration information and the MBMS service data to the UE through the second interface 703.

The MBMS service receiving notification message includes an MBMS service paging message, an MBMS service update message, a base station broadcast message, a connection release indication message, or the like.

Optionally, the base station may further include a third interface (not shown in the figure), configured to interact with an operating management system OAM. The processor 701 is further configured to receive, through the third interface, MBMS support configuration information configured by the OAM, and perform configuration according to the MBMS support configuration information. Specific content of the MBMS support configuration information is corresponding to and the same as that in Embodiment 1.

The processor 701 may send, through the second interface 703, an MBMS service paging message in the cell served by the base station to initiate a paging procedure, or send an MBMS service update message in the cell served by the base station, where a ValTag that is used to indicate a system message change and is in a base station broadcast message is made unchanged when the MBMS service update message is being sent, or send a connection release indication message when a UE that needs to receive the MBMS service data is in an RRC connected state or is transmitting a unicast service, where the connection release indication message is used to instruct the UE to release a connection or terminate the unicast service and receive an MBMS service.

Specifically, the base station may further execute the foregoing data transmission method shown in FIG. 2, and details are not described herein again.

Embodiment 7

Figure 8:
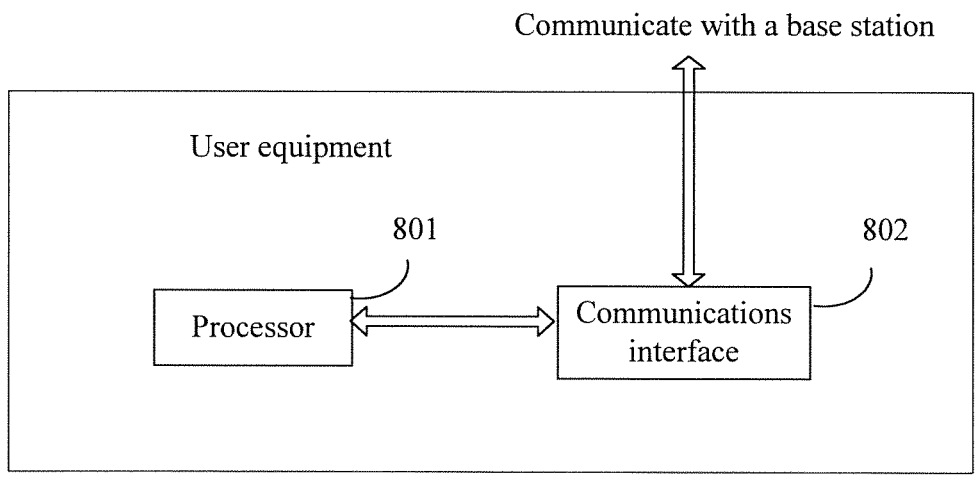
FIG. 8 is a schematic diagram of a composition structure of user equipment according to Embodiment 7 of the present invention.

FIG. 8 is a schematic diagram of a composition structure of user equipment according to this embodiment of the present invention. As shown in FIG. 8, the user equipment in this embodiment of the present invention includes a processor 801 and a communications interface 802.

The processor 801 may be a single-core or multi-core central processing unit (Central Processing Unit, CPU), or an application-specific integrated circuit (Application Specific Integrated Circuit, ASIC), or be configured as one or more integrated circuits that implement this embodiment of the present invention.

The communications interface 802 is configured to interact with a base station.

The processor 801 is configured to:

receive, through the communications interface 802, an MBMS service notification message sent by the base station;

if the MBMS service paging message includes an identifier related to the UE, respond to the MBMS service notification message; and receive, through the communications interface 802, MBMS configuration information and MBMS service data that are sent by the base station.

The MBMS service notification message may be an MBMS service paging message, an MBMS service update message, a connection release indication message, or the like.

When the UE is in a radio resource control RRC idle state, if a received MBMS service paging message includes an identifier related to the UE, the MBMS service paging message is directly responded to; or a connection between the UE and the base station is first established, and the MBMS service paging message is then responded to.

When the UE is in a radio resource control RRC connected state, if a received MBMS service paging message includes an identifier related to the UE, it is determined, according to a receiving capability of the UE or a priority that is of an MBMS service and is in the MBMS service paging message, whether to receive the MBMS service data; if it is determined to receive the MBMS service data, the MBMS service paging message is responded to.

Specifically, the user equipment further executes, according to the instruction, the foregoing data transmission methods shown in FIG. 3 and FIG. 4, and details are not described herein again.

According to the data transmission method, apparatus, and system provided in the present invention, a base station transmits MBMS service data to user equipment by means of initiating paging or sending an update message, so that a terminal can receive a dynamic notification message in time after receiving an MBMS service notification message sent by a network.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A data transmission method, comprising:

receiving, by a base station, a Multimedia Broadcast Multicast Service (MBMS) service transmission request and MBMS service data sent by a core network device;

after receiving the MBMS service transmission request or the MBMS service data, sending, by the base station, an MBMS service paging message in a cell served by the base station, wherein the MBMS service paging message instructs a user equipment (UE) to receive the MBMS service data and indicates multiple MBMS services;

receiving, by the base station, an acknowledgment message sent by the UE, the acknowledgment message indicating a selection of one of the multiple MBMS services in which the UE is interested;

determining, by the base station according to the received acknowledgment message, a quantity of UEs corresponding to a same selected MBMS service in the cell served by the base station;

configuring, by the base station, a transmission manner of the selected MBMS service according to the quantity of UEs; and sending, by the base station, the MBMS service data to the UE in the selected MBMS service according to the MBMS service transmission request.

2. The method according to claim 1, wherein the MBMS service paging message comprises one type of or any combination of the following listed information:
a transceiving manner of each of the plurality of MBMS services, identifier information of each MBMS service, priority information of each MBMS service, and service provider information of each MBMS service.

3. The method according to claim 1, wherein configuring, by the base station, a transmission manner of the selected MBMS service according to the quantity of UEs comprises:
determining, by the base station, whether the quantity of UEs exceeds a preset threshold; and
if the quantity of UEs exceeds the preset threshold, configuring and using a broadcast or multicast manner to transmit the MBMS service data to the UE; or
if the quantity of UEs does not exceed the preset threshold, configuring and using a unicast manner to transmit the MBMS service data to the UE.

4. The method according to claim 1, further comprising:
sending, by the base station, an MBMS service capability query request message to the UE; and
receiving, by the base station, MBMS service capability information fed back by the UE.

5. A base station, comprising:
a first interface configured to interact with a core network device;
a second interface configured to interact with a user equipment (UE); and
a processor configured to:
receive, through the first interface, a Multimedia Broadcast Multicast Service (MBMS) service transmission request and MBMS service data that are sent by the core network device,
after receiving the MBMS service transmission request or the MBMS service data, send, through the second interface, an MBMS service paging message in a cell served by the base station, wherein the MBMS service paging message instructs the UE to receive the MBMS service data, and indicates multiple MBMS services,
receive, through the second interface, an acknowledgment message sent by the UE, the acknowledgment message indicating a selection of one or more of the multiple MBMS services in which the UE is interested,
determine, according to the received acknowledgment message, a quantity of UEs corresponding to a same selected MBMS service in the cell served by the base station,
configure a transmission manner of the selected MBMS service according to the quantity of UEs, and
configure MBMS configuration information according to the selected MBMS service transmission request, and send the MBMS configuration information and the MBMS service data in the selected MBMS service to the UE through the second interface.

6. The base station according to claim 5, wherein the MBMS service paging message sent by the processor through the second interface comprises one type of or any combination of the following listed information:
a transceiving manner of each of the plurality of MBMS service, identifier information of each MBMS service, priority information of each MBMS service, and service provider information of each MBMS service.

7. The base station according to claim 5, wherein the processor is further configured to:
determine whether the quantity of UEs exceeds a preset threshold; and
if the quantity of UEs exceeds the preset threshold, configure and use a broadcast or multicast manner to transmit the MBMS service data to the UE through the second interface, or
if the quantity of UEs does not exceed the preset threshold, configure and use a unicast manner to transmit the MBMS service data to the UE through the second interface.

8. The base station according to claim 5, wherein the processor is further configured to:
send an MBMS service capability query request message to the UE through the second interface; and
receive, through the second interface, MBMS service capability information fed back by the UE.

9. User equipment (UE), comprising:
a communications interface configured to interact with a base station; and
a processor configured to:
receive, through the communications interface, a Multimedia Broadcast Multicast Service (MBMS) service paging message sent by the base station, the MBMS service paging message indicates multiple MBMS services,
if the MBMS service paging message comprises an identifier related to the UE, respond to the MBMS service paging message by sending an acknowledgement message to the base station, the acknowledgment message indicating a selection of one of the multiple MBMS services in which the UE is interested, the acknowledgement message configured to allow the base station to determine, based on the acknowledgement message and other acknowledgement messages received from other UEs, a transmission manner of the selected MBMS service, and
receive, through the communications interface, MBMS configuration information and MBMS service data that are sent by the base station in the selected MBMS service.

10. The user equipment according to claim 9, wherein the identifier related to the UE comprises one of or any combination of the following listed identifiers:
a UE identifier that matches an identifier of the UE;
a UE group identifier that matches an identifier of a group to which the UE belongs;
an MBMS service identifier that matches the selected MBMS service in which the UE is interested; and
an MBMS session identifier that matches an identifier of an MBMS session in which the UE is interested.

11. The user equipment according to claim 9, wherein if the UE is in a radio resource control (RRC) idle state, the processor is further configured to:
if the MBMS service paging message instructs the UE to use a broadcast or multicast manner to receive the MBMS service data, prepare to receive the MBMS service data through the communications interface or first establish a connection with the base station through the communications interface, and prepare to receive the MBMS service data.

12. The user equipment according to claim 9, wherein if the UE is in a RRC idle state, the processor is further configured to:
if the MBMS service paging message instructs the UE to use a unicast manner to receive the MBMS service data, establish a connection with the base station through the communications interface, and prepare to receive the MBMS service.

13. The user equipment according to claim 9, wherein:

if the UE is in an RRC connected state, the processor is further configured to: determine, according to a receiving capability of the UE and/or a priority that is of an MBMS service and is in the MBMS service paging message, whether to receive the MBMS service data; and the processor is further configured to: when it is determined to receive the MBMS service data, receiving, through the communications interface, the MBMS configuration information and the MBMS service data sent by the base station.

* * * * *